US012610890B2

(12) United States Patent
Graham et al.

(10) Patent No.: US 12,610,890 B2
(45) Date of Patent: Apr. 28, 2026

(54) RAKE APPARATUS

(71) Applicant: Vermeer Manufacturing Company, Pella, IA (US)

(72) Inventors: Curt T. Graham, Lynnville, IA (US); Nathan D. Dockter, Pella, IA (US); Kent Thompson, Otley, IA (US); Grant Hoppes, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 427 days.

(21) Appl. No.: 18/319,297

(22) Filed: May 17, 2023

(65) Prior Publication Data

US 2023/0371433 A1 Nov. 23, 2023

Related U.S. Application Data

(60) Provisional application No. 63/342,956, filed on May 17, 2022.

(51) Int. Cl.
*A01D 78/06* (2006.01)
*A01D 78/00* (2006.01)
*A01D 89/00* (2006.01)

(52) U.S. Cl.
CPC .......... *A01D 78/06* (2013.01); *A01D 78/001* (2013.01); *A01D 89/007* (2013.01)

(58) Field of Classification Search
CPC ........ A01D 41/10; A01D 57/00–57/30; A01D 78/00–78/20; A01D 89/00–89/008; A01D 84/00
See application file for complete search history.

(56) References Cited

U.S. PATENT DOCUMENTS

| | | | | |
|---|---|---|---|---|
| 479,033 | A | * | 7/1892 | Swift ..................... A01D 78/06 56/376 |
| 2,694,895 | A | | 11/1954 | Gronlund |
| 2,711,065 | A | | 6/1955 | Orelind |
| 2,731,782 | A | | 1/1956 | Mason |
| 2,735,256 | A | | 2/1956 | West |
| 2,736,206 | A | * | 2/1956 | Conner .................. A01D 78/06 474/134 |

(Continued)

FOREIGN PATENT DOCUMENTS

| | | | | |
|---|---|---|---|---|
| CH | 327994 | A | * | 2/1958 |
| DE | 3026912 | A1 | | 2/1982 |

(Continued)

*Primary Examiner* — Joseph M Rocca
*Assistant Examiner* — Madeline I Runco
(74) *Attorney, Agent, or Firm* — Armstrong Teasdale LLP

(57) ABSTRACT

A rake apparatus is disclosed. The rake apparatus includes a plurality of material gathering members connected to a continuous conveyor member such as a chain or a belt. A drive sprocket supports the conveyor member at a discharge end of the rake apparatus. An idler sprocket supports the conveyor member at a distal end of the rake apparatus. The material gathering members contact a bottom stripper guard and a top stripper guard as they travel about the raking device to remove crop material from the material gathering members. The rake apparatus may be part of a harvesting machine in which the processing chamber of the harvesting machine has a width that is the same width as the pickup device of the harvesting machine.

20 Claims, 30 Drawing Sheets

(56)  References Cited

U.S. PATENT DOCUMENTS

| | | | |
|---|---|---|---|
| 2,756,557 A | | 7/1956 | Bornzin |
| 2,783,606 A | | 3/1957 | Wilson |
| 3,074,222 A | | 1/1963 | Raymond |
| 3,120,092 A | * | 2/1964 | Van Der Lely ...... C07D 213/73 |
| | | | 56/400 |
| 3,125,845 A | | 3/1964 | Lee |
| 3,879,923 A | * | 4/1975 | Granger ................. A01D 51/00 |
| | | | 56/376 |
| 4,300,337 A | * | 11/1981 | Sharp .................... A01D 78/06 |
| | | | 56/364 |
| 4,776,157 A | * | 10/1988 | van der Lely ..... A01D 78/1078 |
| | | | 56/370 |
| 5,040,362 A | * | 8/1991 | Morgan ................. A01D 57/22 |
| | | | 56/93 |
| 5,400,578 A | | 3/1995 | Galanti |
| 5,404,702 A | | 4/1995 | Lewis |
| 2002/0059790 A1 | | 5/2002 | Paulsen |
| 2019/0343049 A1 | * | 11/2019 | Doran ................. A01B 63/008 |

FOREIGN PATENT DOCUMENTS

| | | | | |
|---|---|---|---|---|
| DE | 3429980 | A1 | 2/1986 | |
| DE | 8912479 | U1 | 2/1991 | |
| DE | 202022103271 | U1 * | 6/2022 | ............ A01D 78/06 |
| EP | 0157456 | A2 | 10/1985 | |
| EP | 715804 | A1 | 6/1996 | |
| EP | 1084605 | B1 | 5/2008 | |
| EP | 2281435 | A2 * | 2/2011 | ......... A01D 78/1014 |
| EP | 2727454 | A1 | 5/2014 | |
| EP | 2047739 | B2 | 2/2016 | |
| EP | 3017683 | A1 | 5/2016 | |
| ES | 2548105 | A2 | 10/2015 | |
| FR | 2769462 | A1 | 4/1999 | |
| GB | 2173383 | A | 10/1986 | |
| JP | 2006050929 | A | 2/2006 | |
| WO | 1994010828 | A1 | 5/1994 | |
| WO | 2008059354 | A1 | 5/2008 | |
| WO | WO-2017143418 | A1 * | 8/2017 | ............ A01D 57/20 |

* cited by examiner

600

650

10

200

202

MOVE, BY A CARRIER DRIVEN BY A MOTOR, MATERIAL GATHERING MEMBERS THAT ARE ATTACHED TO THE CARRIER ALONG A DEFINED PATH

204

COLLECT, BY THE MATERIAL GATHERING MEMBER, MATERIAL ON FIRST AND SECOND GATHERING SURFACES

206

REMOVE, BY UPPER AND LOWER STRIPPER GUARDS, MATERIAL FROM THE GATHERING SURFACES

RAKE APPARATUS

CROSS REFERENCE TO RELATED APPLICATIONS

This application claims the benefit of priority to U.S. Provisional Patent Application No. 63/342,956, filed May 17, 2022, the contents and disclosure of which are incorporated by reference herein in their entirety.

FIELD OF THE DISCLOSURE

The field of the disclosure relates to rake apparatus for moving crop material and, in particular, rake apparatus having stripper guards for removing crop material from the material gathering members of the rake apparatus.

BACKGROUND

Many different devices have been developed for moving crop material on the ground into a crop windrow. To harvest crop materials (e.g., forage materials), the crops are cut and lie loose on the ground. The crop material is gathered into a row or "windrow" before being harvested by the harvesting machine. The harvesting machine includes a crop pickup device (or simply a "pickup") that moves the windrow into the machine during harvesting. Often the crop pickup is wider than the crop processing unit (e.g., baling chamber) of the machine. These wider pickups typically include crop material windrow narrowing elements such as a pair of augers that narrow the windrow of crop material as it enters the processing unit of the machine. This narrowing function changes the direction of travel of the incoming crop material from a primary longitudinal direction to a perpendicular lateral direction in which the width of the crop material is narrowed. Forcing the crop material to move in a different direction causes, in some conditions, inconsistent crop flow into the processing unit.

There is an ongoing need for a rake apparatus having reduced size, weight and complexity. There is also a need for rake apparatus that may be mounted adjacent a crop pickup of an implement to narrow crop material into alignment with the crop pickup. Further, there is a need for an improved overall harvesting machine configuration that improves the consistency of the flow of incoming crop material.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure includes a rake for conveying and releasing material gathered by the rake. The rake includes a carrier moveable in a defined path. The rake further includes at least one material gathering member attached to the carrier to be movable with the carrier in the defined path. Each of the at least one material gathering members includes a first gathering surface, a second gathering surface, and a tip located away from the carrier. The material collects on one or both of the surfaces of each of the at least one gathering members as each of the at least one material gathering members is moved along the defined path. The rake further includes a stripper guard proximate the carrier, a first portion of the stripper guard defining a conveying zone of the defined path and a second portion of the stripper guard defining a releasing zone of the defined path. The at least one material gathering member is adapted to move closely adjacent or in contact with the stripper guard in the releasing zone, to enable the releasing zone stripper guard to promote the displacement of the material from the respective first and second gathering surfaces of each of the at least one material gathering members.

Another aspect of the present disclosure includes a method for releasing material from a material gathering members included in a rake. The rake is coupled to a vehicle wherein the rake includes a carrier moveable in a defined path and at least one material gathering member attached to the carrier to be movable with the carrier in the defined path. Each of the at least one material gathering members includes a first side, a second side, and a tip located away from the carrier. The material collects on one or both of the sides of each of the at least one gathering members as each of the at least one material gathering members is moved along the defined path. A stripper guard is proximate the carrier. A first portion of the stripper guard defines a conveying zone of the defined path and a second portion of the stripper guard defines a releasing zone of the defined path. The method includes moving the at least one material gathering member closely adjacent or in contact with the stripper guard in the releasing zone, to promote the displacement of the material from the respective first and second sides of each of the at least one material gathering members.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
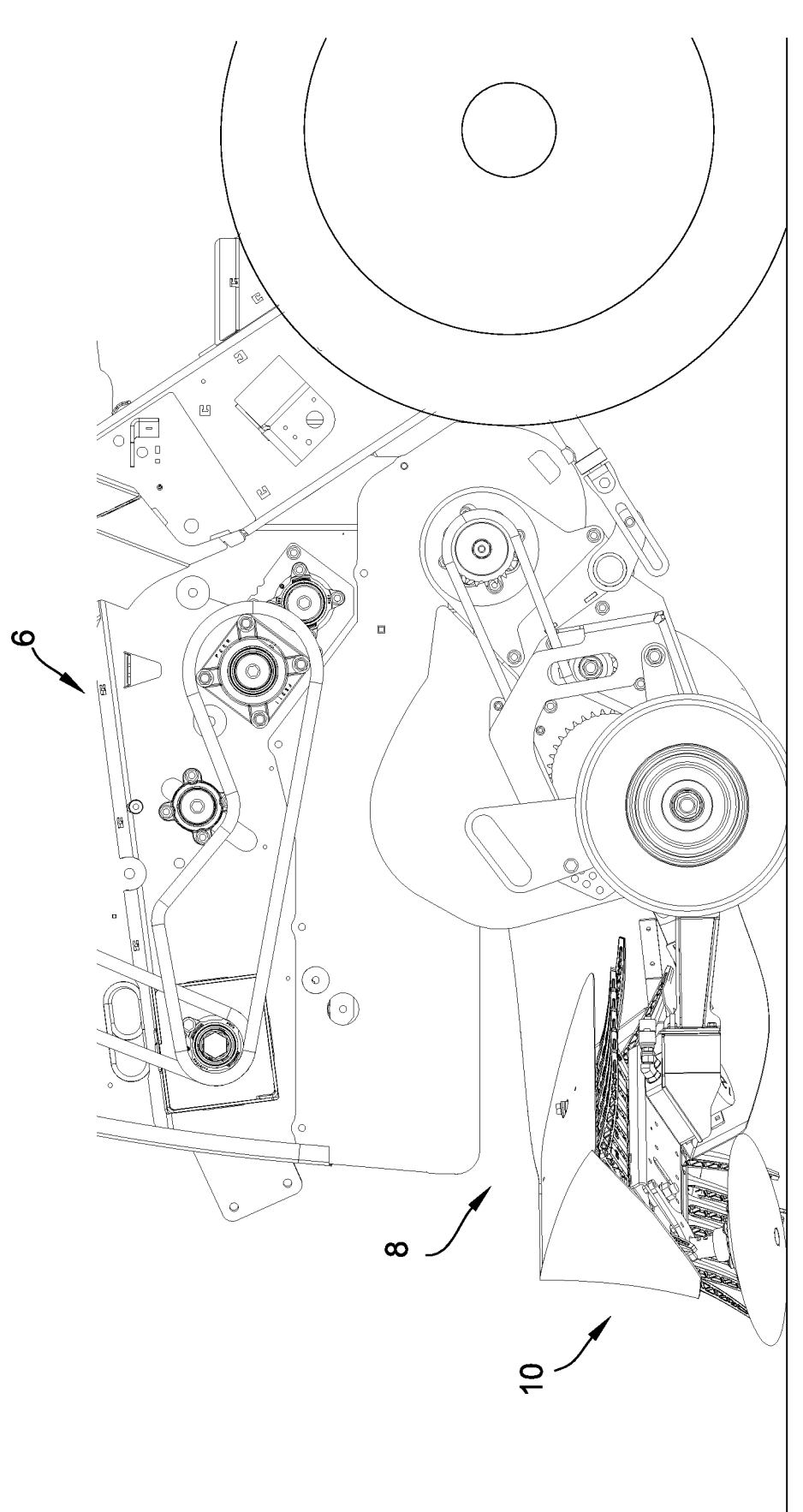
FIG. 1 is a perspective view of a moveable machine equipped with a rake apparatus.

Referring now to FIG. 1, rake apparatus 10 is generally configured to rake crop materials lying on the ground. The rake apparatus 10 may be connected to a variety of vehicles 6. The vehicles 6 may include a crop pickup 8.

Figure 2:
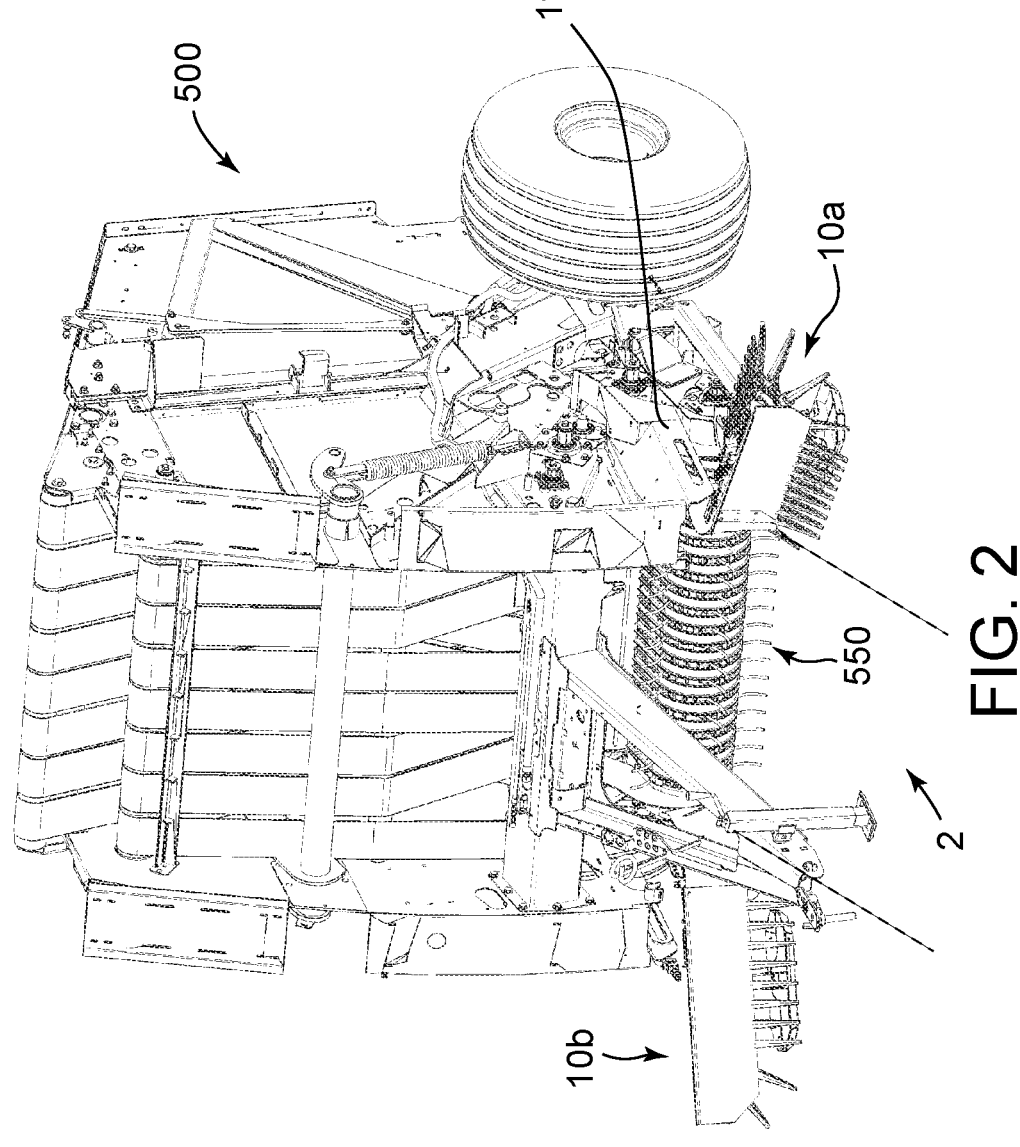
FIG. 2 is a perspective view of a round baler equipped with the rake apparatus.

For example, and as shown in FIG. 2, a first rake apparatus 10A and a second rake apparatus 10B are mounted adjacent the sides of a crop pickup 550. The first and second rake apparatuses 10A, 10B move the incoming crop material into alignment with the sides of the crop pickup 550. The crop pickup 550 may be configured to be the same width as a crop processing unit of the implement. As the crop pickup moves along, an area approximately the width of the crop pickup is defined as a pickup zone 2 of the first and second rake apparatuses 10A, 10B. Advantageously, any crop material in a windrow that is outside the pickup zone 2 will be moved over by the first and second rake apparatuses 10A, 10B. The first and second rake apparatuses 10A, 10B pick up and move the crop material into the pickup zone 2, where the crop material is in alignment with the crop pickup 550. The crop pickup 550 of the implement may be simplified such as by removing augers that would otherwise have been a part of the machine. For example, the crop pickup 550 of the round baler 500 is the same width as the baling chamber.

The first and second rake apparatuses 10A, 10B are coupled to the round baler 500 on either side of the pickup zone 2. The first and second rake apparatuses 10A, 10B are coupled to side frame members 11. The rake apparatuses 10A, 10B are connected to the side frame members 11 and rake apparatuses 10A, 10B may be moved toward or away from the vehicle side.

Figure 3:
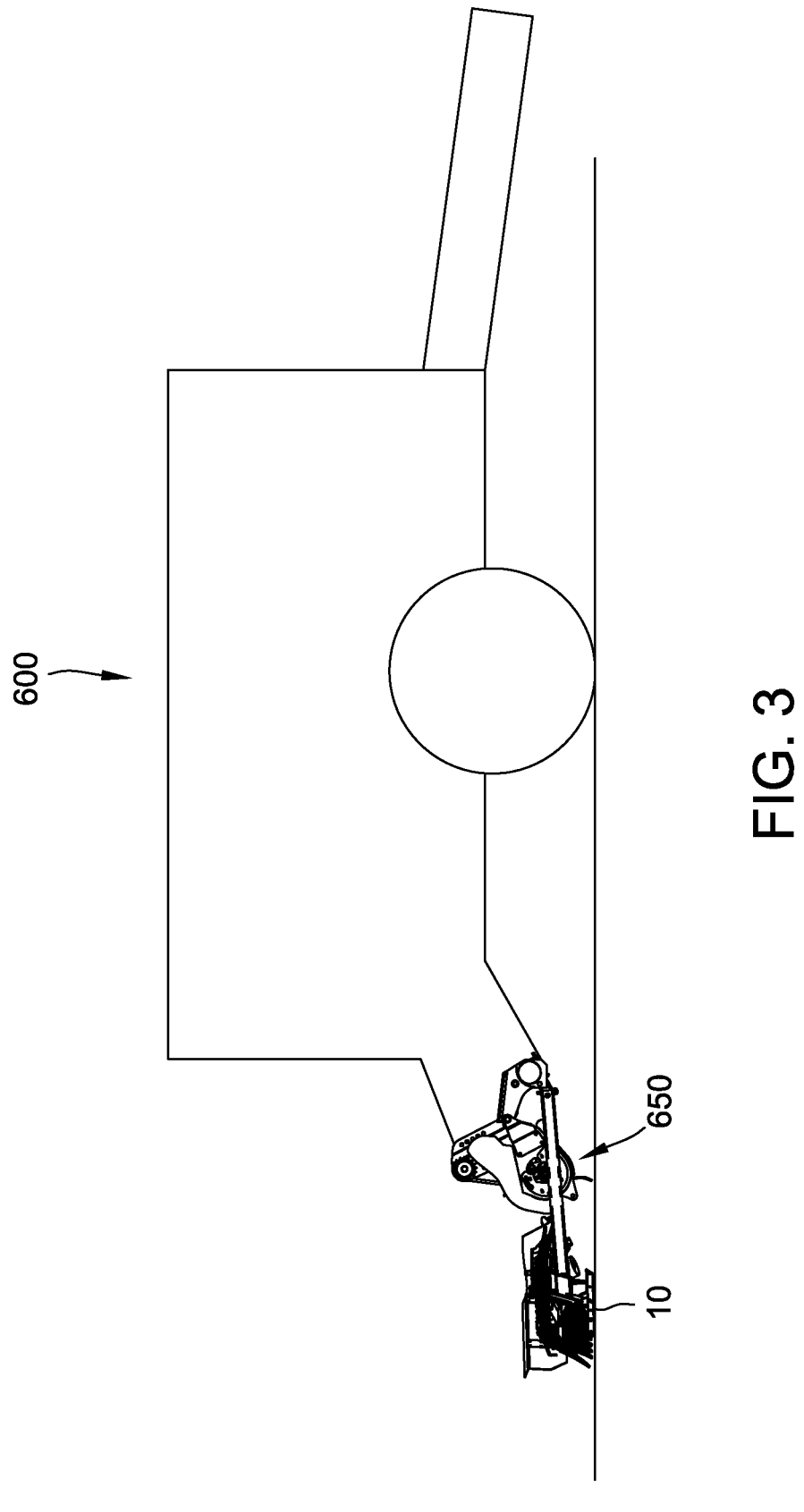
FIG. 3 is a side schematic view of a large square baler that includes the rake apparatus.
Figure 4:
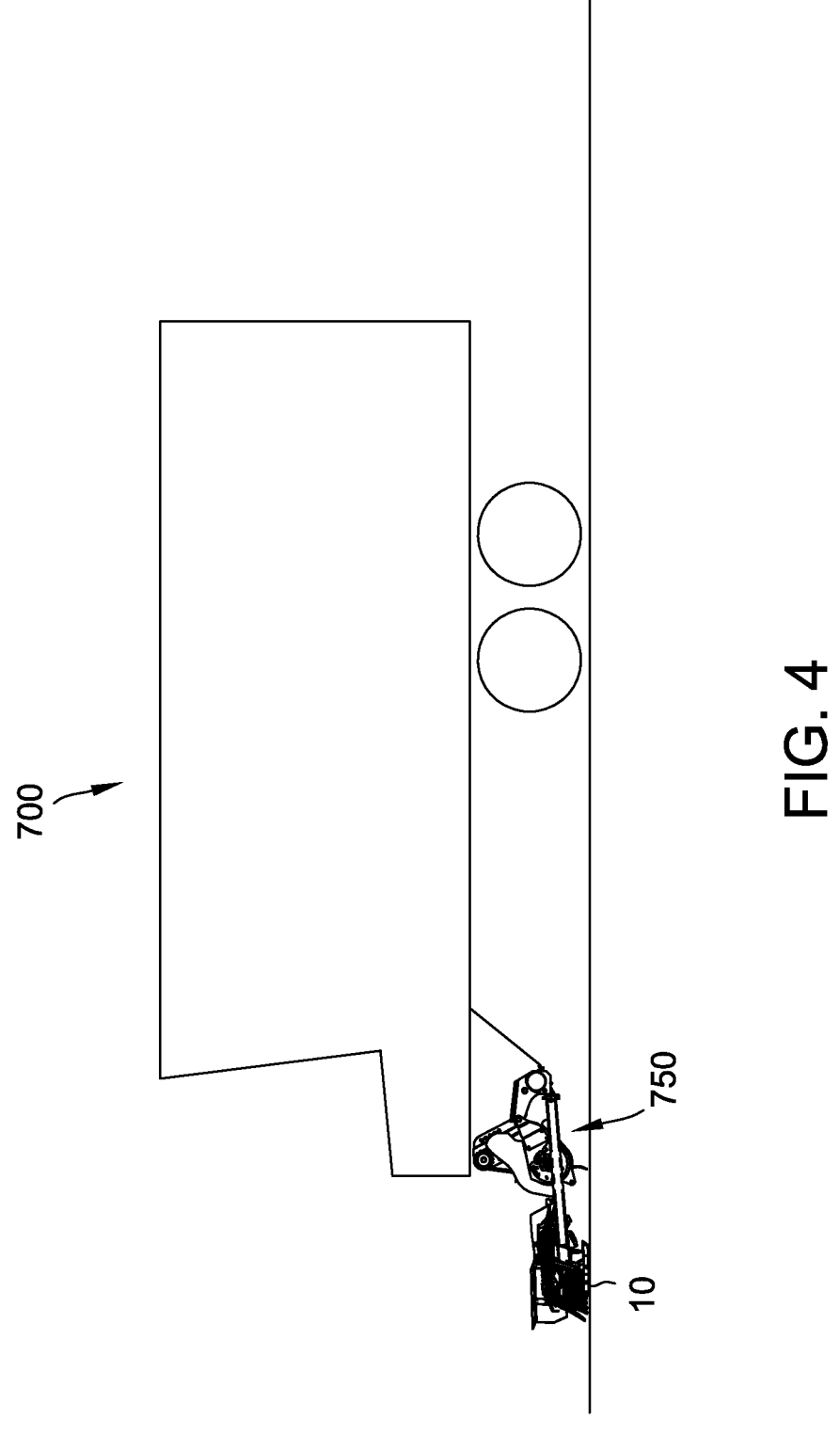
FIG. 4 is a side schematic view of self-loading silage wagon that includes the rake apparatus.

The rake apparatus 10 may be connected to an implement for harvesting crop material. For example, the rake apparatus 10 gathers and directs material toward a crop pickup 650 (FIG. 3) of a large square baler 600, a crop pickup 750 (FIG.

Figure 5:
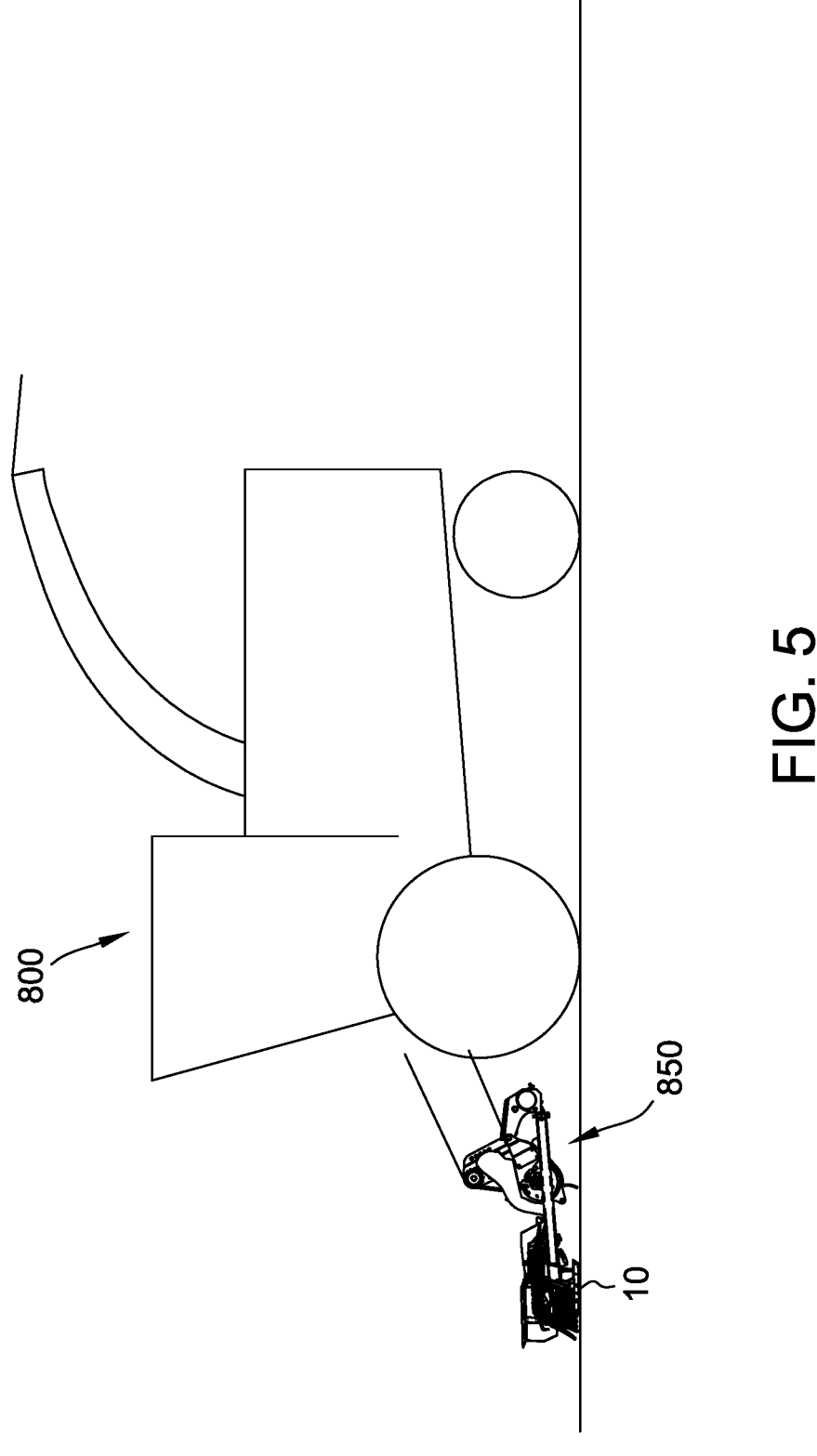
FIG. 5 is a side schematic view of a self-propelled forage chopper that includes the rake apparatus.

4) of a self-loading silage wagon 700, or a crop pickup 850 of a self-propelled forage chopper 800 (FIG. 5).

Figure 6:
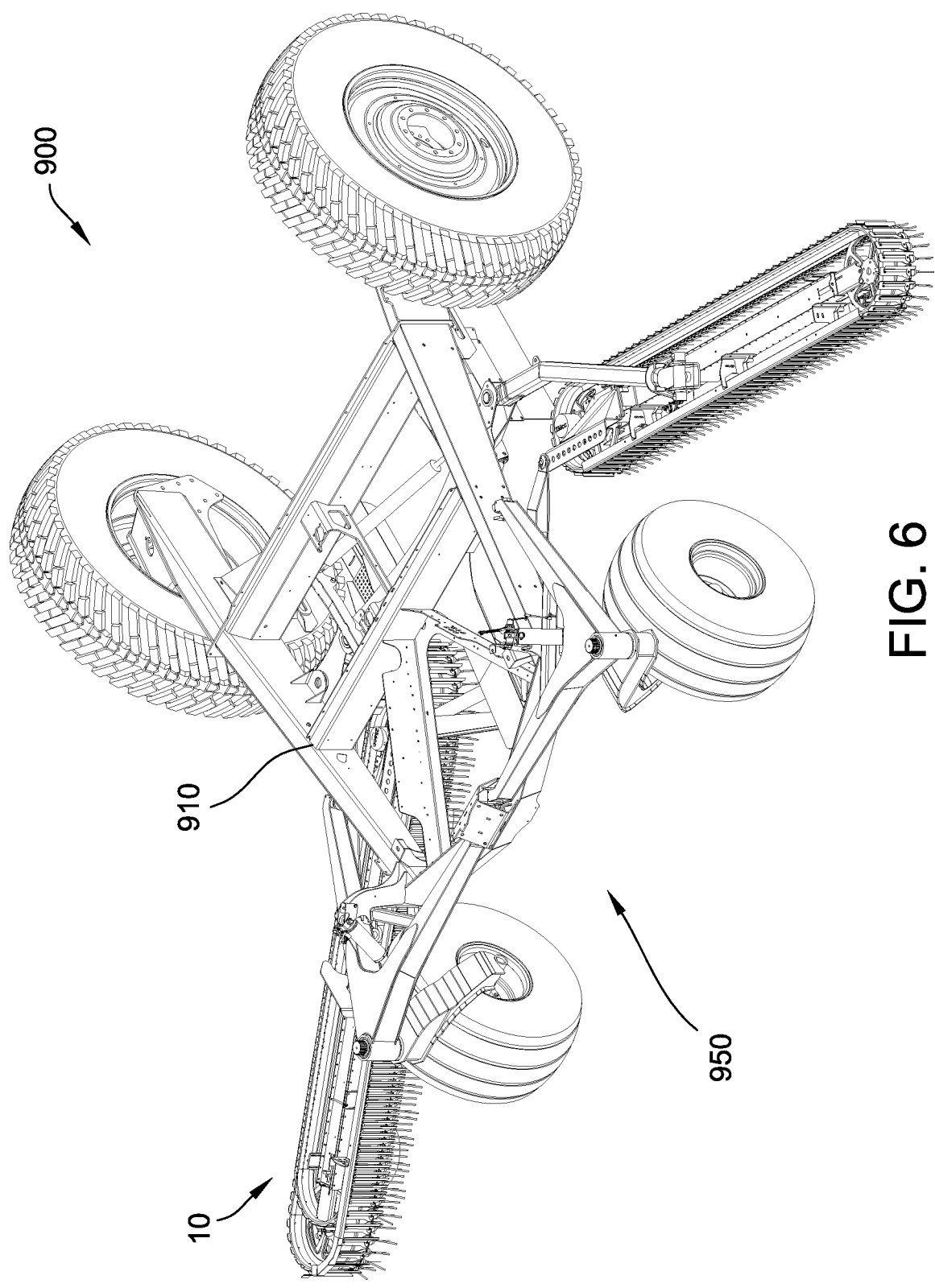
FIG. 6 is a perspective view of the frame of a self-propelled baler that includes the rake apparatus.

As shown in FIG. 6, the rake apparatus 10 gathers and directs material toward a crop pickup 950 of a self-propelled baler 900. FIG. 6 shows a frame 910 of the self-propelled baler 900 that includes a pair of raking apparatuses 10 mounted along the sides of the frame 910. The rakes 10 include a mechanism that enables the rakes 10 to be repositioned along the sides and moved under the frame 910 for storage.

Figure 7:
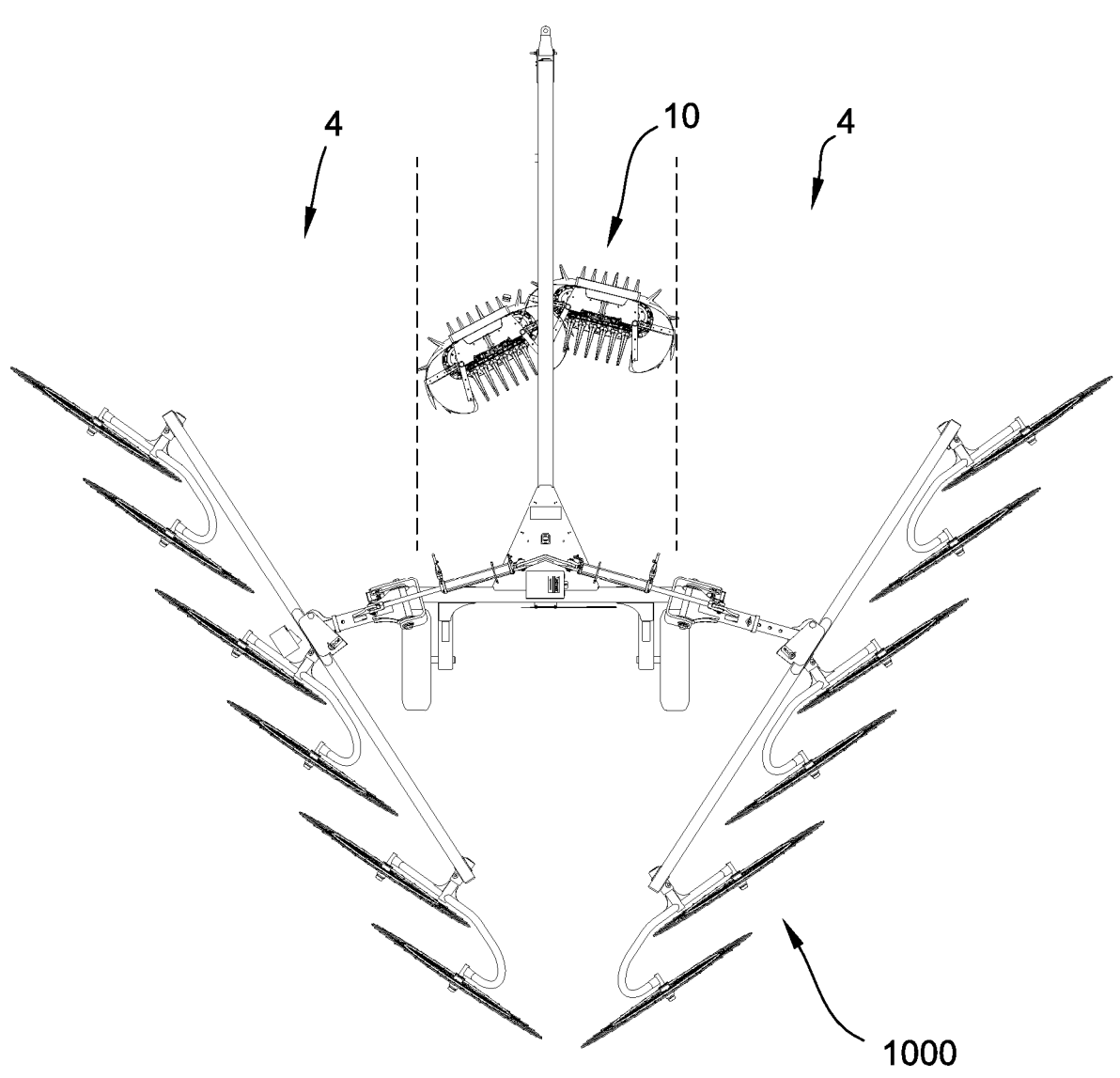
FIG. 7 is a larger rake that includes the rake apparatus.

As shown in FIG. 7, the rake apparatus 10 gathers and directs material which is otherwise not moved by a larger rake, such as a forage rake 1000. In this embodiment, the rake apparatus 10 runs in a reverse direction with regard to what is described above. That is, the rake apparatus spreads out crop material from a center point so that the crop material is in the path of the larger rake. Therefore, the rake apparatus moves crop material to a rake zone 4. In this embodiment, the rake apparatus 10 acts as a center splitter or a windrow splitting device.

Figure 8:
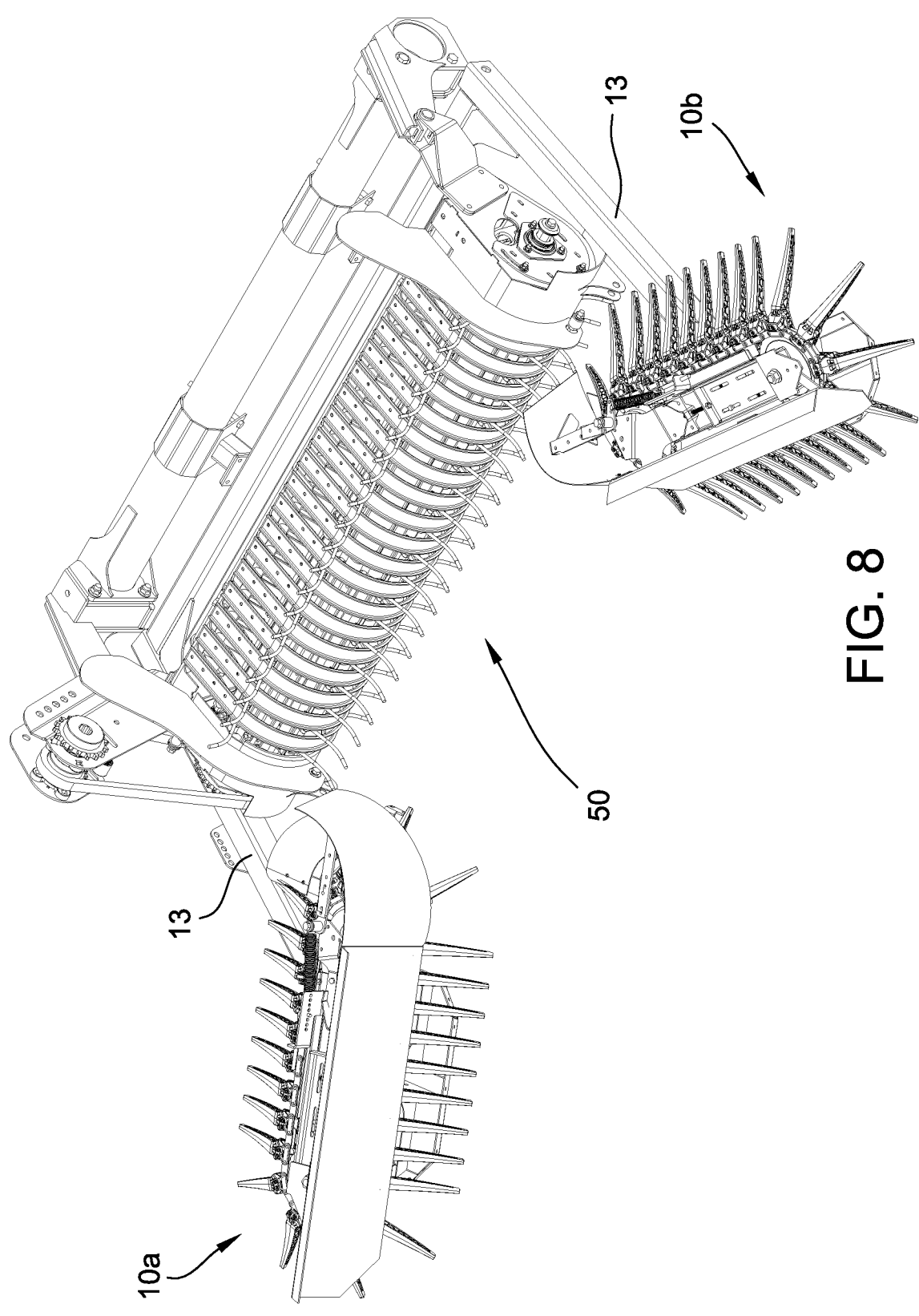
FIG. 8 is a perspective view of an embodiment of a crop pickup and first and second rake apparatus mounted adjacent the crop pickup.
Figure 9:
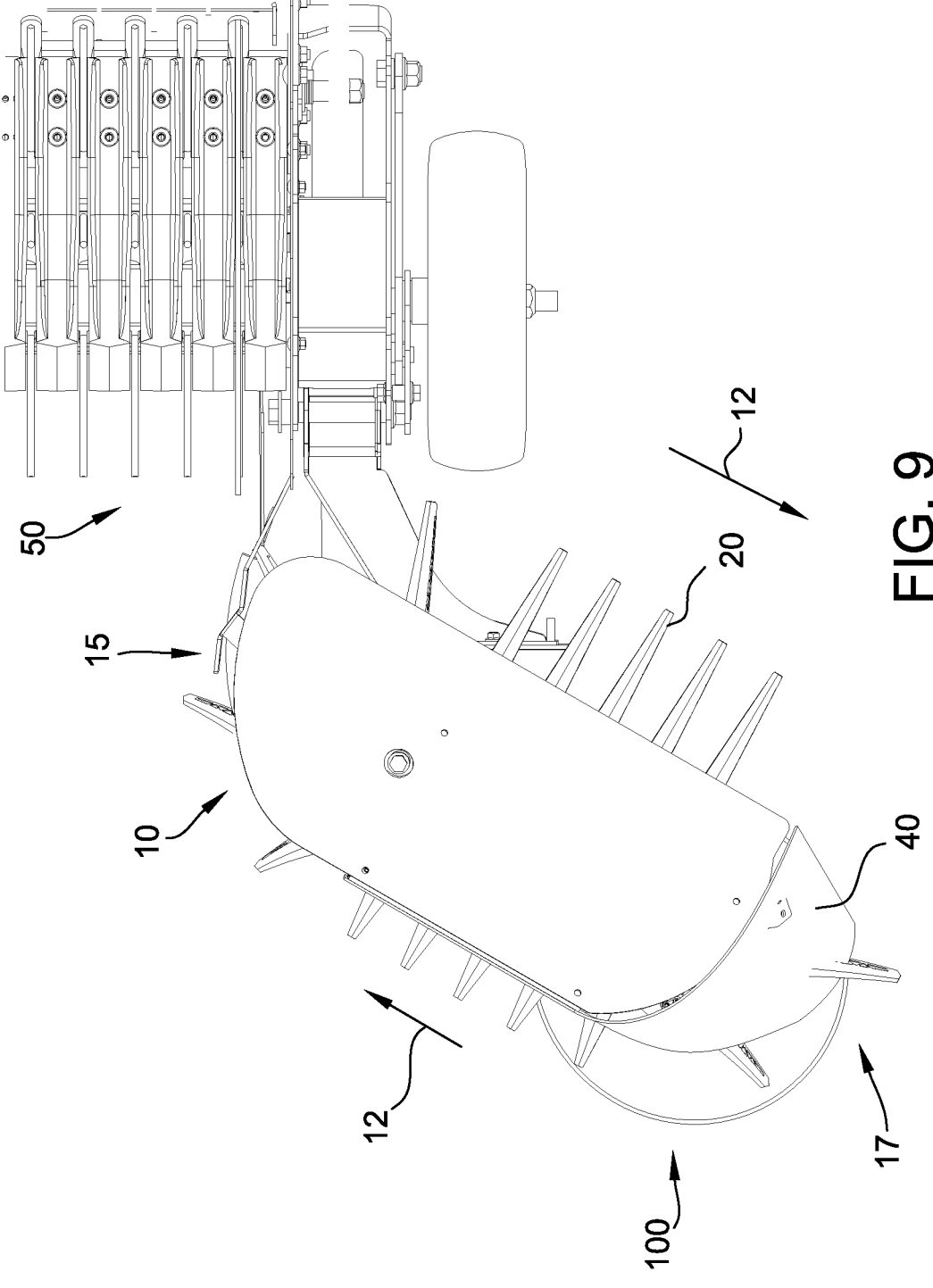
FIG. 9 is a top view of the rake apparatus.
Figure 10:
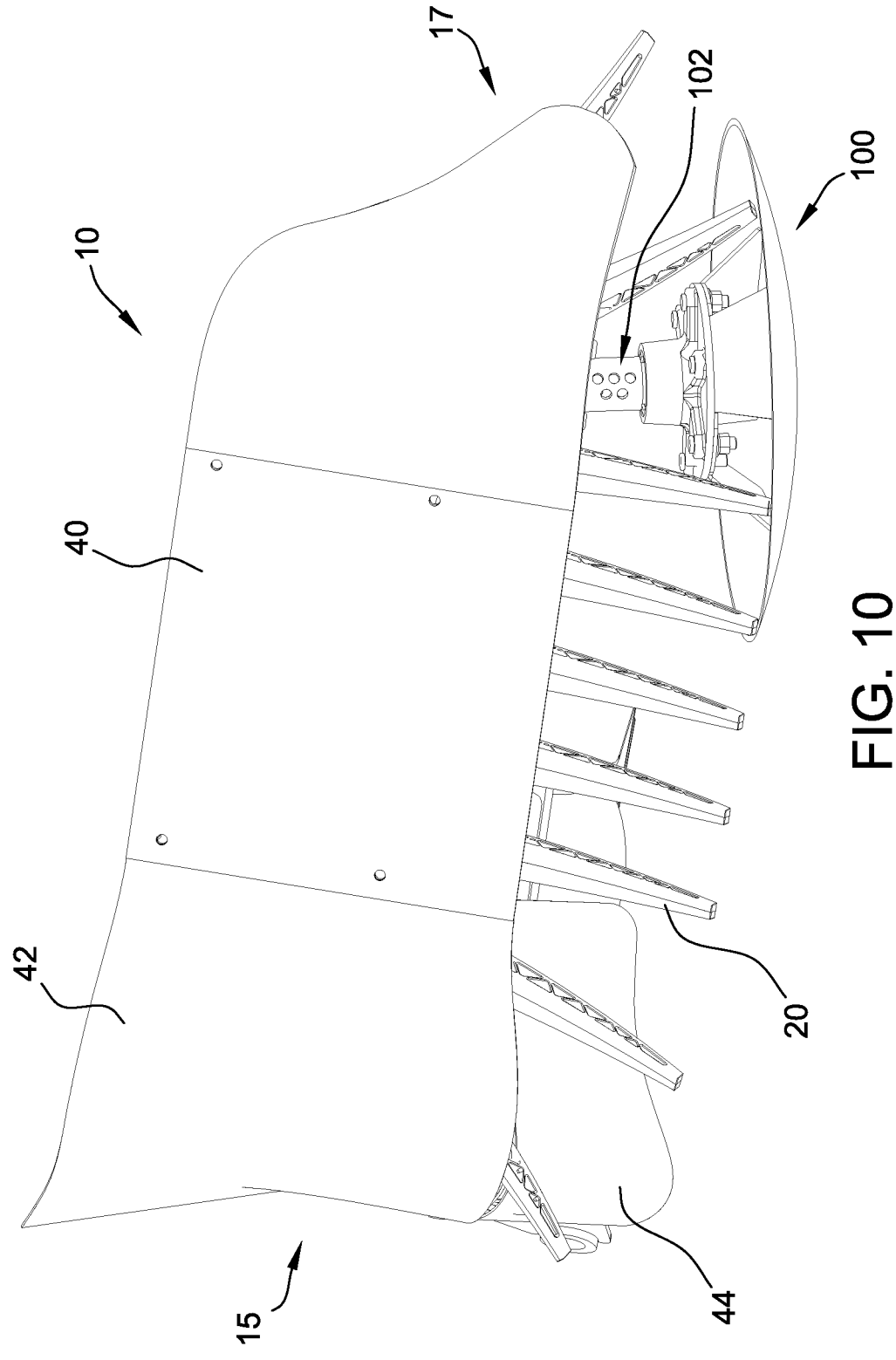
FIG. 10 is a perspective view of a rake apparatus.

FIG. 8 depicts a more detailed perspective view of a crop pickup 50 and first rake apparatus 10a and second rake apparatus 10b mounted with mounting arms 13 adjacent the crop pickup 50.

FIGS. 9-12 depict various views of the rake apparatus 10. The rake apparatus 10 includes a front deflector guard 40, an upper stripper guard 42, and a lower stripper guard 44. Arrow 12 indicates a direction of travel for a plurality of material gathering members 20. The material gathering members 20 pick up the crop and move the crop towards the crop pickup 50 along the direction of arrow 12. As the material gathering members 20 travel around the rake apparatus 10, the front deflector guard 40, the upper stripper guard 42 and the lower stripper guard 44 remove the crop from the material gathering members 20 and deposit the crop into the path of the crop pickup 50.

In embodiments of the present disclosure, the front deflector guard 40, the upper stripper guard 42, and the lower stripper guard 44 are formed from a sheet material which is relatively thin with desired flexibility. The sheet material may made from Ultra High Molecular Weight Polyethylene (UHMW), nylon, sheet metal, or any other suitable material.

The lower stripper guard 44 is positioned generally below and closer to the discharge end 15 relative to the front deflector guard 40. The front deflector guard 40 is generally located near an intake end 17, and the upper stripper guard 42 spans a distance from the front deflector guard 40 to the discharge end 15. The material gathering members 20 pass under the front deflector guard 40 and the upper stripper guard 42 and over the lower stripper guard 44 as the material gathering members 20 travel about the rake apparatus 10.

The front deflector guard 40, the upper stripper guard 42, and the lower stripper guard 44 each include a tapered construction, resulting in an arcuate shape. The taper of each of the front deflector guard 40, upper stripper guard 42, and the lower stripper guard 44 form a path through which the material gathering members 20 travel as the material gathering members move about the rake apparatus 10. As the material gathering members 20 travel about the rake apparatus 10, the material gathering members 20 move closely adjacent or in direct contact with the upper stripper guard 42 and the lower stripper guard 44 at the discharge end 15 of the rake apparatus. This allows crop material to disengage from the material gathering members 20 and deposit the crop in a region where the pickup 50 can engage the crop. After the crop is discharged the material gathering members 20 travel back toward the intake end 17 of the apparatus 10.

The rake apparatus 10 further includes a skid 100. The skid 100 enables the rake apparatus 10 to move along uneven ground such that the rake apparatus floats at a consistent height as the terrain changes. The skid 100 may be fixedly or pivotally mounted to the rake apparatus. In configurations where the skid 100 is pivotally mounted, the skid 100 may be formed as a convex plate, which aids in the ability to slide over rough terrain without digging into the ground. The skid 100 includes adjustment holes 102, which allow for adjusting the height of the skid 100 relative to the rake apparatus 10.

Figure 11:
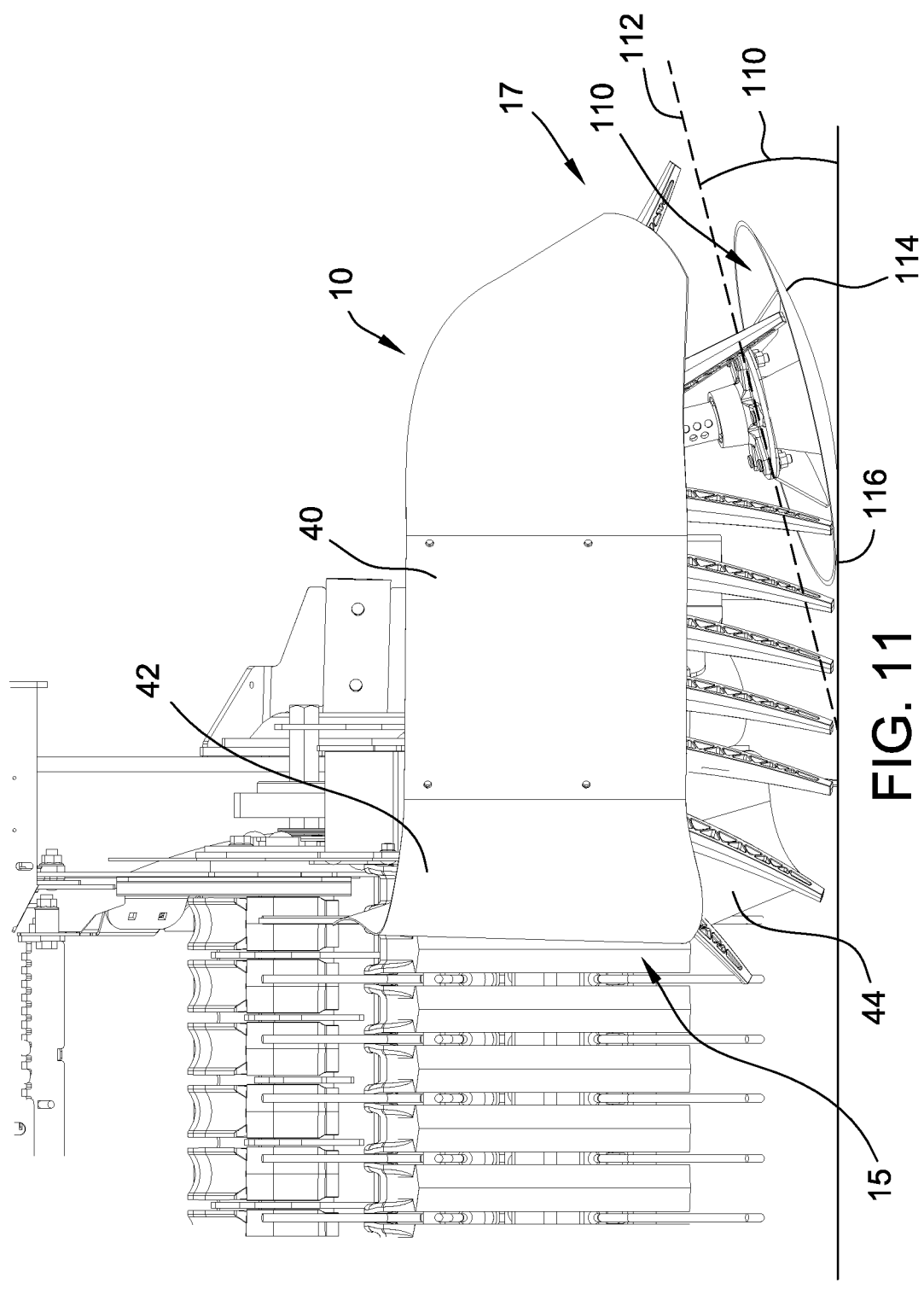
FIG. 11 is a side view of the rake apparatus.

The adjustment of mounting arm 13 (see FIG. 8) and/or the mounting of skid 100 allows for adjustment in in the angle of the skid relative to the ground in at least two directions. Referring to FIG. 11, the skid 100 forms a front skid angle 110 relative to the ground, wherein the front skid angle 110 is an angle formed between the ground and a line 112 representing a planar surface of the skid. The front skid angle 110 may be adjusted between 0 and 30 degrees. The front skid angle 110 allows an outside edge 114 to be higher relative to the ground with regard to an inside edge 116. The front skid angle 110 allows for greater clearance between the skid 100 and the ground at the outside edge 114, accommodating any terrain changes and allowing the rake apparatus 10 to glide across the ground. The front skid angle 110 also prevents the material gathering members 20 from impacting and becoming embedded in the ground.

Figure 12:
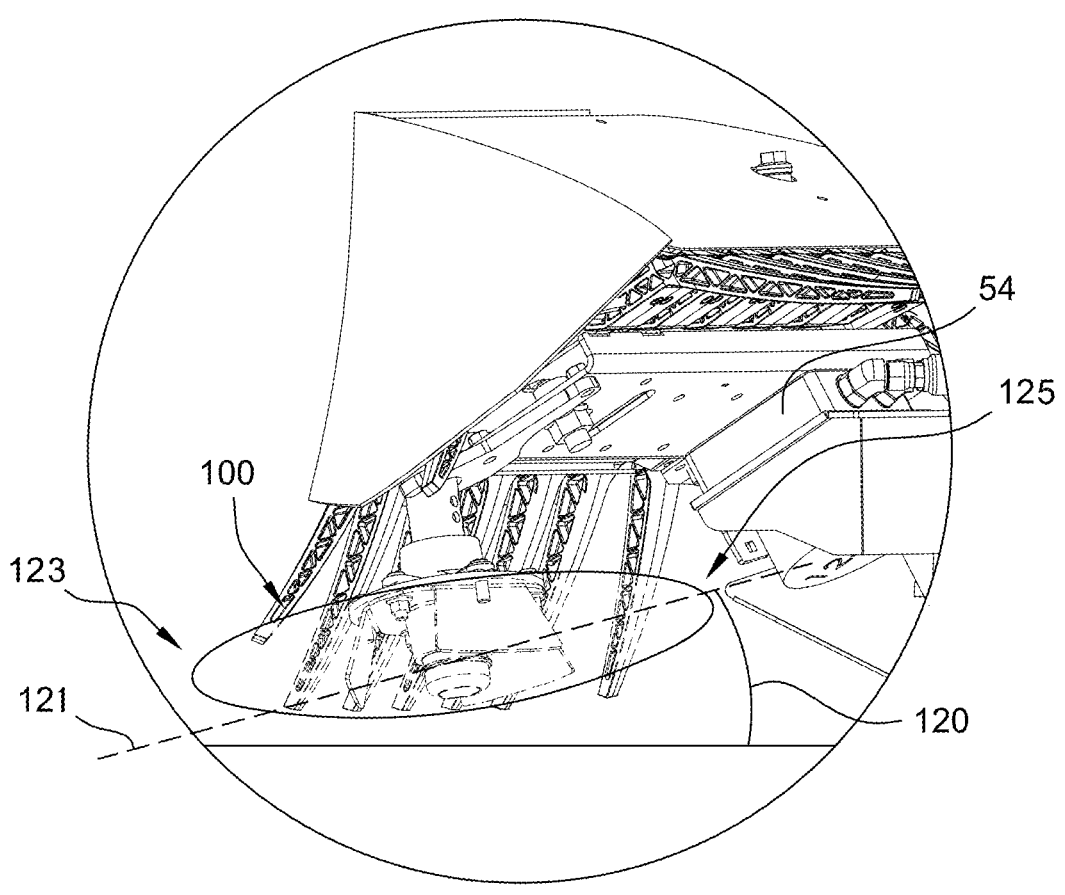
FIG. 12 is another view of the rake apparatus depicting the skid.

FIG. 12 depicts another angle of adjustment of the skid 100. Similarly, as described above with regard to the front skid angle 110, the skid 100 forms a side skid angle 120 relative to the ground, wherein the side skid angle 120 is an angle formed between the ground and a line 121 representing a planar surface of the skid. The side skid angle 120 may be adjusted between 0 and 30 degrees. Similarly, as described above, the side skid angle 120 allows for greater clearance between the skid 100 and the ground at a first side 123 with regard to a second side 125.

Figure 13:
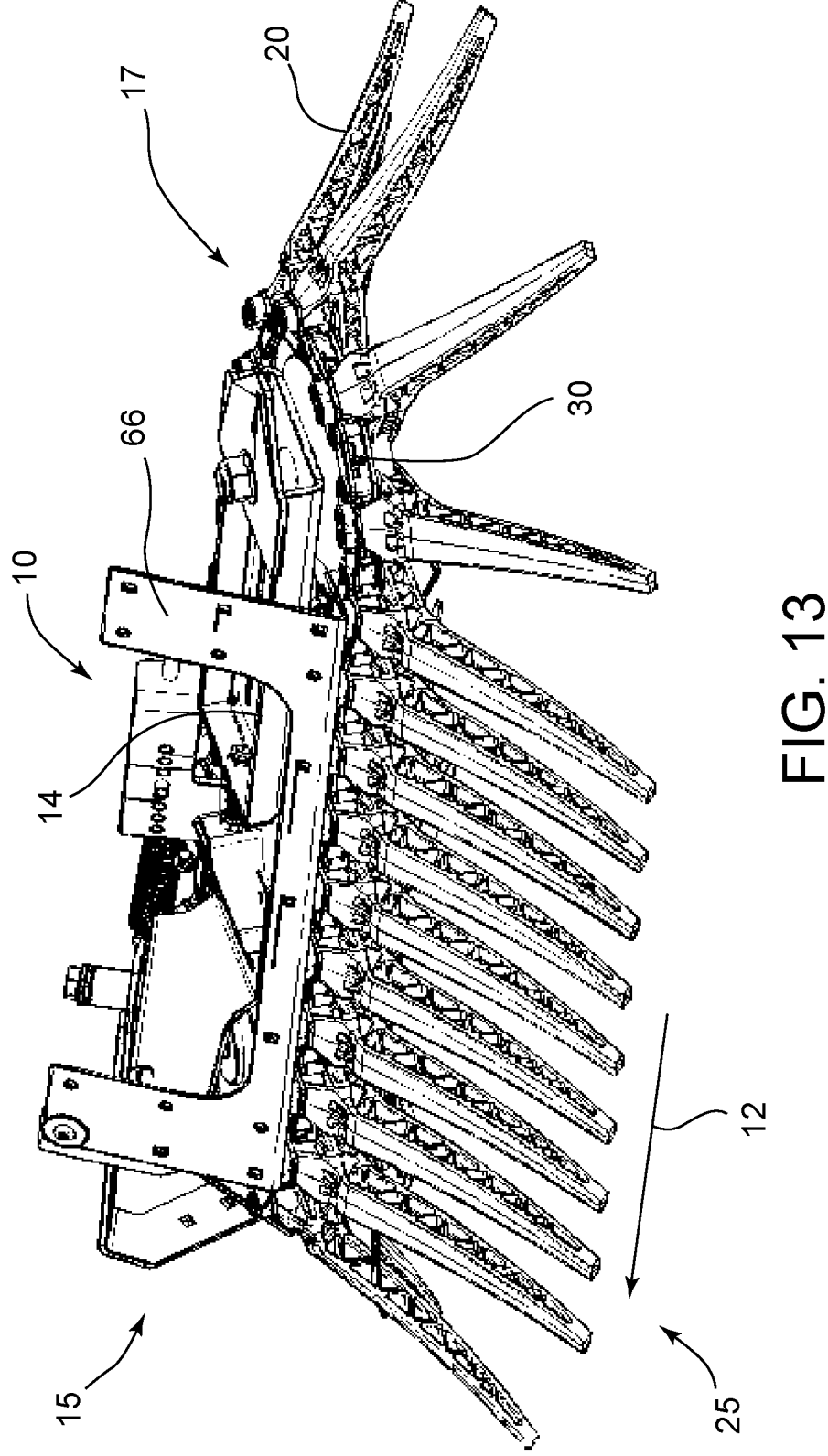
FIG. 13 is a perspective view of the rake apparatus with the front deflector guard and upper stripper guard not shown.
Figure 22:
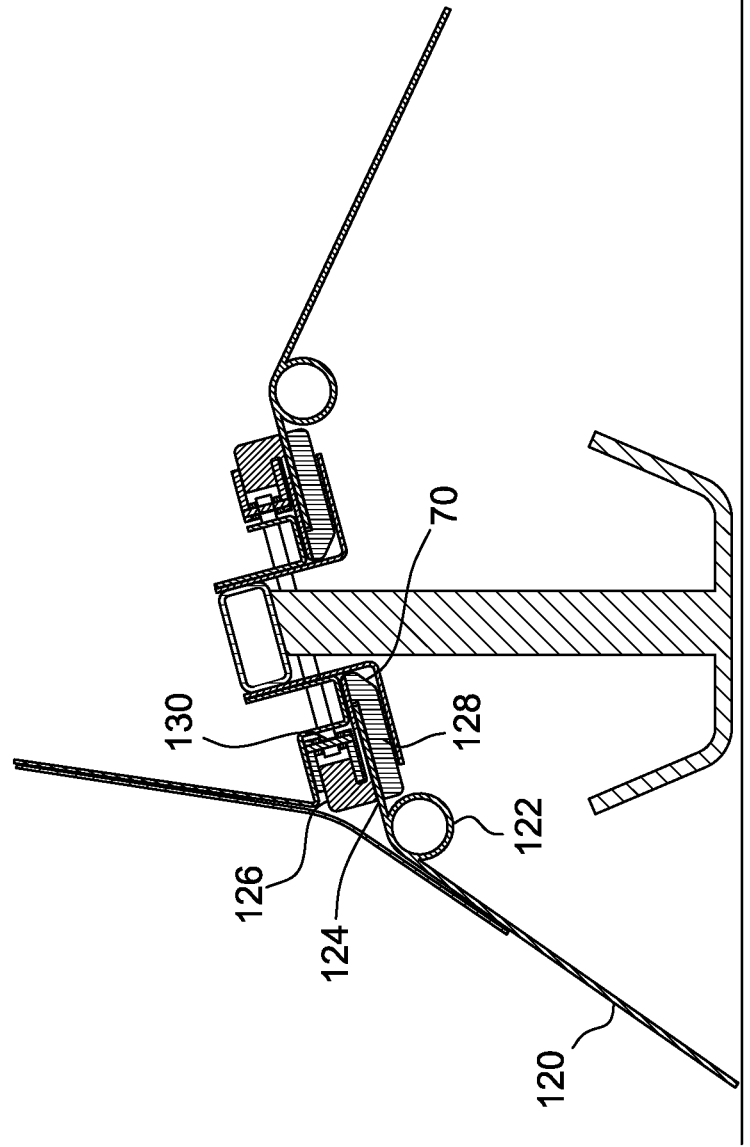
FIG. 22 is a cross-section of the rake apparatus showing another embodiment of a tine.

Referring to FIG. 13, the rake apparatus 10 is shown with the stripper guards removed to show a continuous carrier 30 (e.g., belt or chain) and a plurality of material gathering members 20 connected to the carrier 30. The carrier 30 forms a continuous loop to move material along the direction indicated by arrow 12. In the illustrated embodiment, the carrier 30 is a conveyor including a roller chain having chain links 32 (shown in FIGS. 24 and 25) with an extended section 34 for attaching material gathering members 20. In other embodiments, carriers 30 other than a roller chain may be used such as a V-belt, flat belt, or a cogged belt. The material gathering members 20 may have any suitable configuration that allows the rake apparatus 10 to function as described herein and, in some embodiments, are plastic (e.g., injection molded), steel wire (as shown in FIG. 22), and/or rubber mounted steel tines.

Figure 14:
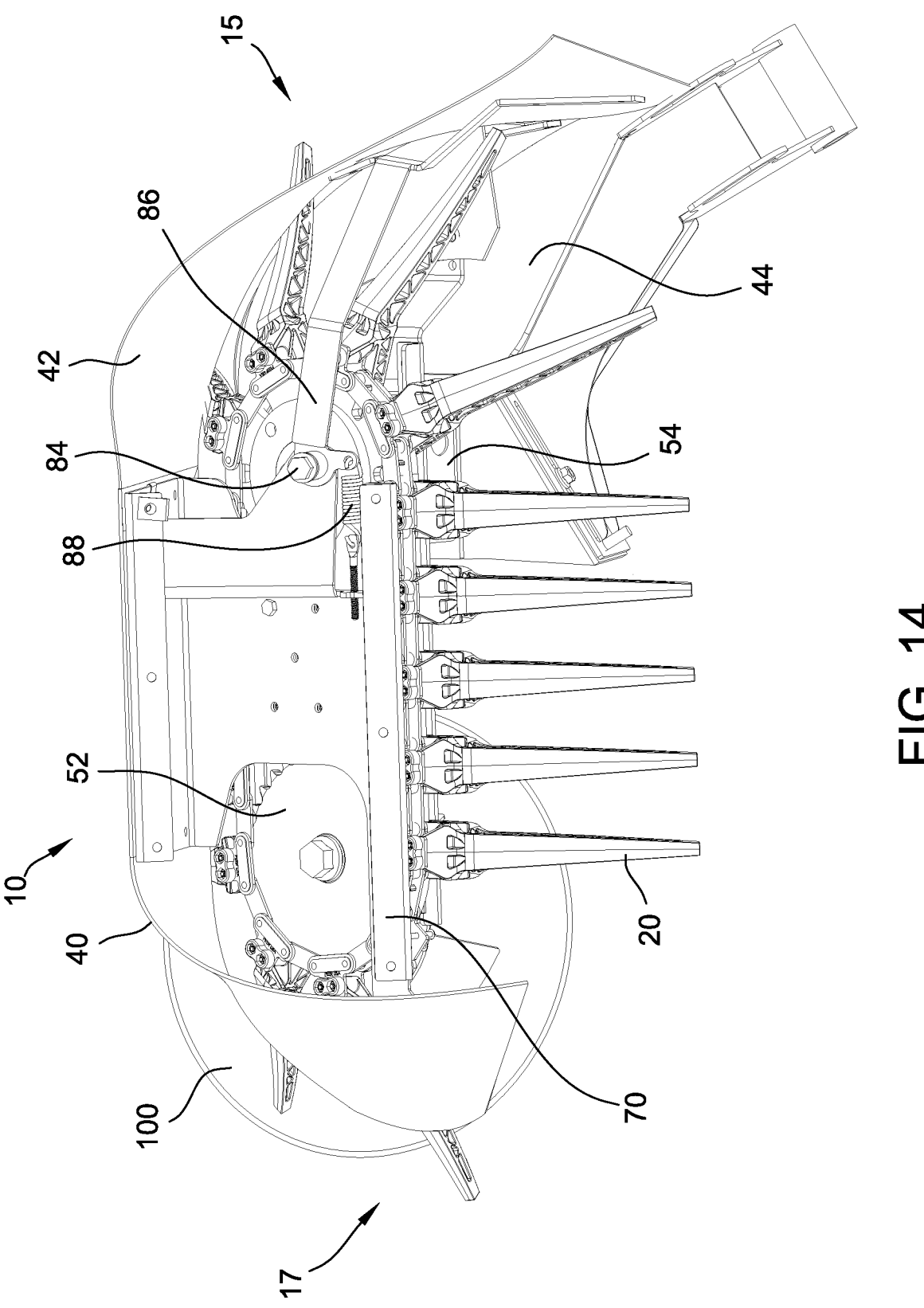
FIG. 14 is a perspective view of the rake apparatus showing the drive sprocket.

Turning to FIG. 14, a drive motor 54 drives and rotates a drive sprocket 52. The drive motor 54 may have a variable speed and therefore, the speed of the sprocket 52 and the carrier 30 can be adjusted. In embodiments including multiple rake apparatuses 10, the speed of each of the corresponding drive motors 54 may be adjusted individually. For example, a rake apparatus 10, mounted on the left side of a vehicle pickup may have a different speed than a rake apparatus 10 mounted on the right side of the same vehicle pickup.

In some embodiments the rotational speed of drive motor 54 is adjusted to change the linear speed of material gathering members 20. The speeds of the rake apparatuses may result in different crop placement, for example, in configurations where the rake apparatus 10 is on the left and right of a pickup, a slower rake speed may result in a wider windrow of crop entering the pickup, conversely, a faster rake speed may result in a more narrow windrow entering the pickup. Similarly, a faster rake speed on the left side may result in a windrow that directs more crop to the right side of the pickup, the inverse is also true, where a faster rake speed on the right side may result in more crop being directed to the left side of the pickup.

Figure 15:
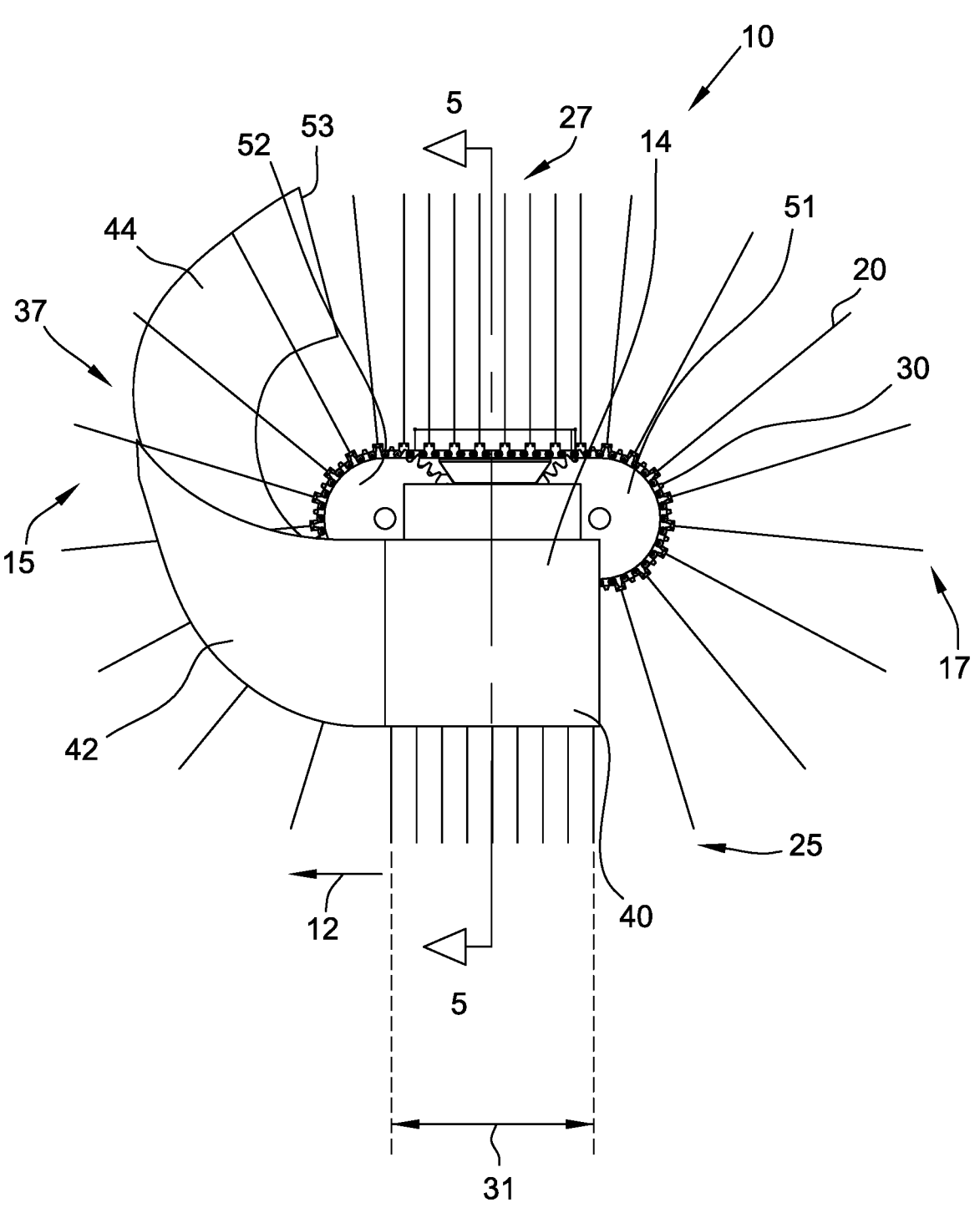
FIG. 15 is a schematic of the rake apparatus.

The rake apparatus 10 is shown schematically in FIG. 15. The carrier 30 rotates around a drive sprocket 52 at a discharge end 15 of the apparatus 10 and rotates around an idler sprocket 51 at an intake end 17 of the apparatus 10. The rake apparatus 10 is shown schematically in FIG. 15 as being relatively short. The length of the raking device may vary (e.g., lengthened) by changing the length of components and the number of material gathering members 20 (or even adding components such as additional sprockets or rollers) without departing from the scope of the present disclosure.

The material gathering members 20 travel in the raking direction 12. On the front side 25 of the rake apparatus 10, the carrier 30 and material gathering members 20 move from the idler sprocket 51 towards the drive sprocket 52 and move in the opposite direction on the back side 27 of the apparatus 10. A conveying zone 31 is defined on the straight section along the length of the apparatus 10 on the front side 25 and the back side 27. The front deflector guard 40 is substantially planar along the conveying zone 31. A guide channel 70 (shown in FIG. 14 and described in further detail below) supports the material gathering members 20 as they traverse the conveying zone 31. A releasing zone 37 is defined around the curved edge of the rake apparatus 10, where the material gathering members 20 move through the upper and lower stripper guards 42, 44. The releasing zone terminates at the end 53 of stripper guards 42, 44. As the material gathering members 20 move through the conveying zone 31, the material gathering members 20 collect crop material and move the material through the conveying zone 31 in the conveying direction 12. Once the material gathering members reach the releasing zone 37, the material gathering members 20 scrape along an edge of the the upper and lower stripper guards 42, 44, removing the crop material from the material gathering members 20.

Figure 27A:
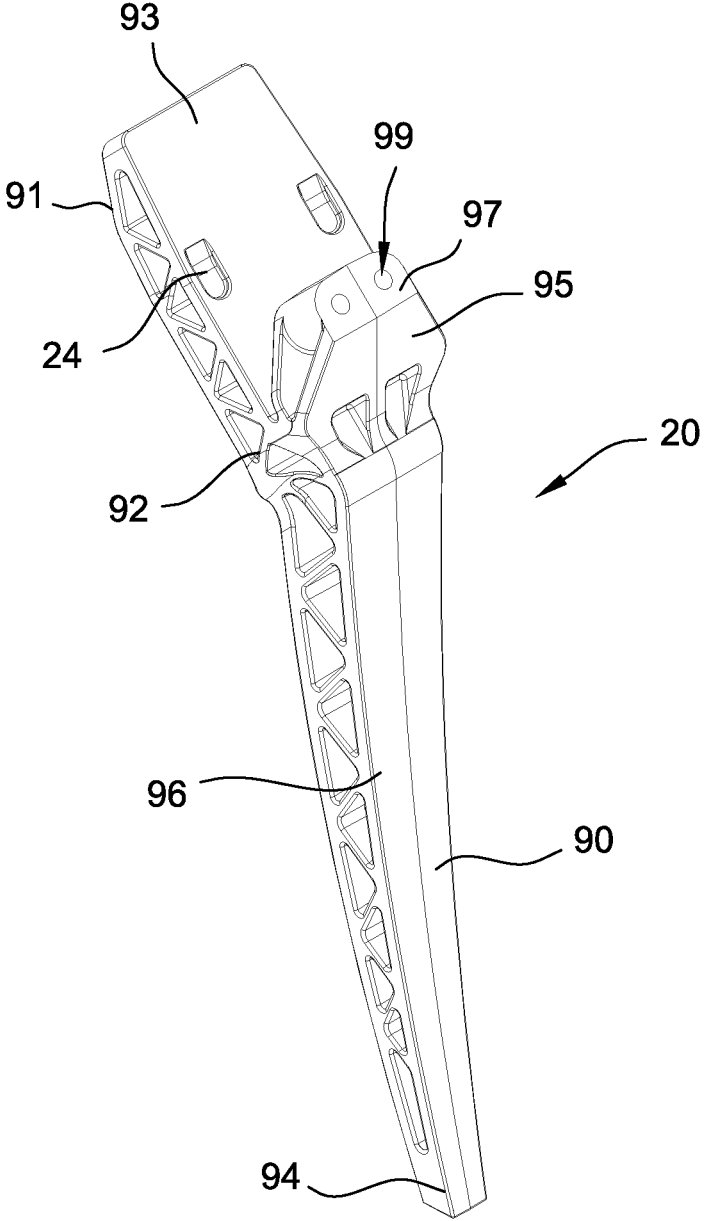
FIGS. 27A and 27B are detailed perspective views of the tine.
Figure 27B:
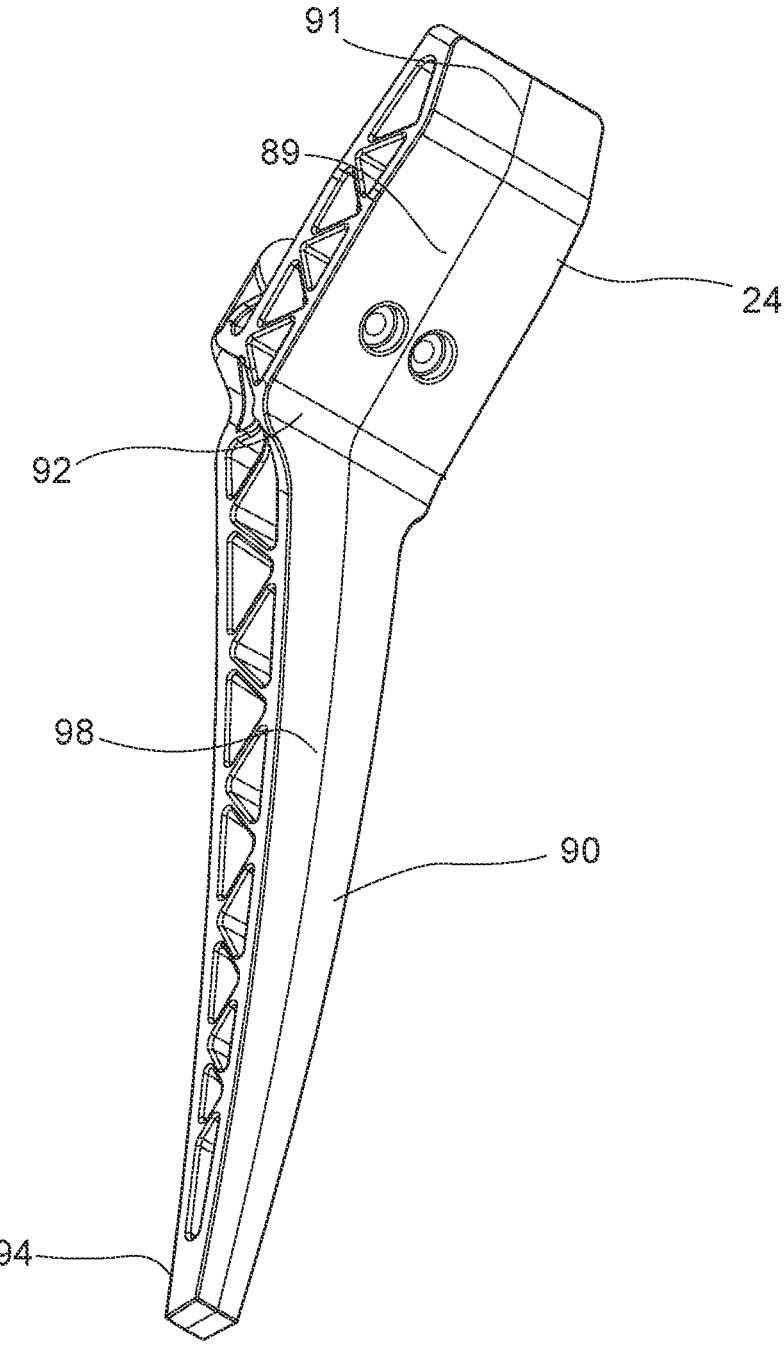

When the material gathering members 20 enter the releasing zone 37, the upper and lower stripper guards 42, 44 contact the material gathering members 20 closer to a root 92 (see FIGS. 27A and 27B). As the material gathering members 20 move through the releasing zone 37 and move toward first end 53, the stripper guards 42, 44 are contoured such that the stripper guards 42, 44 contact the material gathering member 20 nearest a tip 94 (see FIGS. 27A and 27B). This allows the stripper guards 42, 44 to scrape along the length of the material gathering member 20 to remove the crop material.

Figure 16:
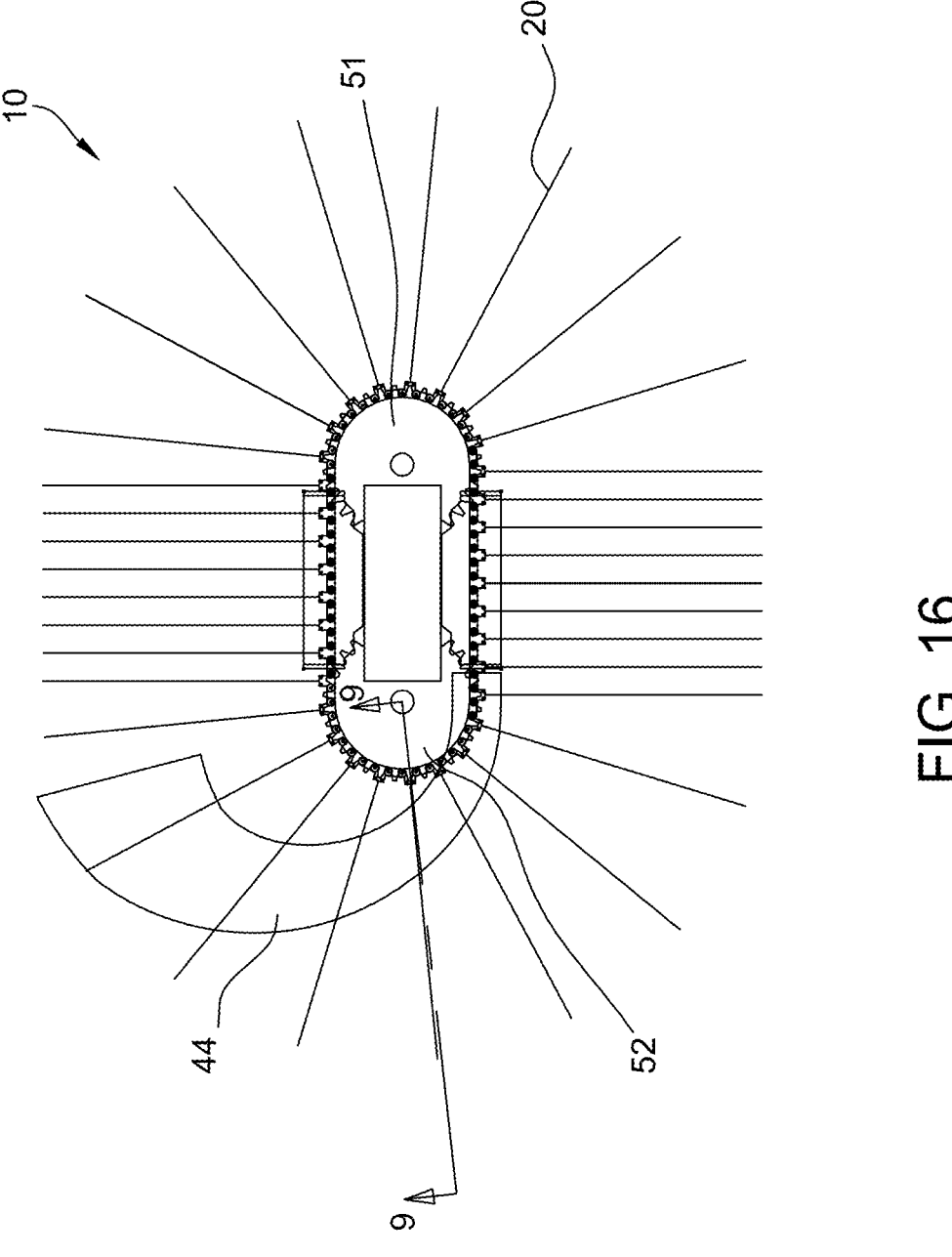
FIG. 16 is a schematic of the rake apparatus with the front deflector guard and upper stripper guard not shown.

FIG. 16 is a schematic of the rake apparatus with the front deflector guard and upper stripper guard not shown.

Figure 17:
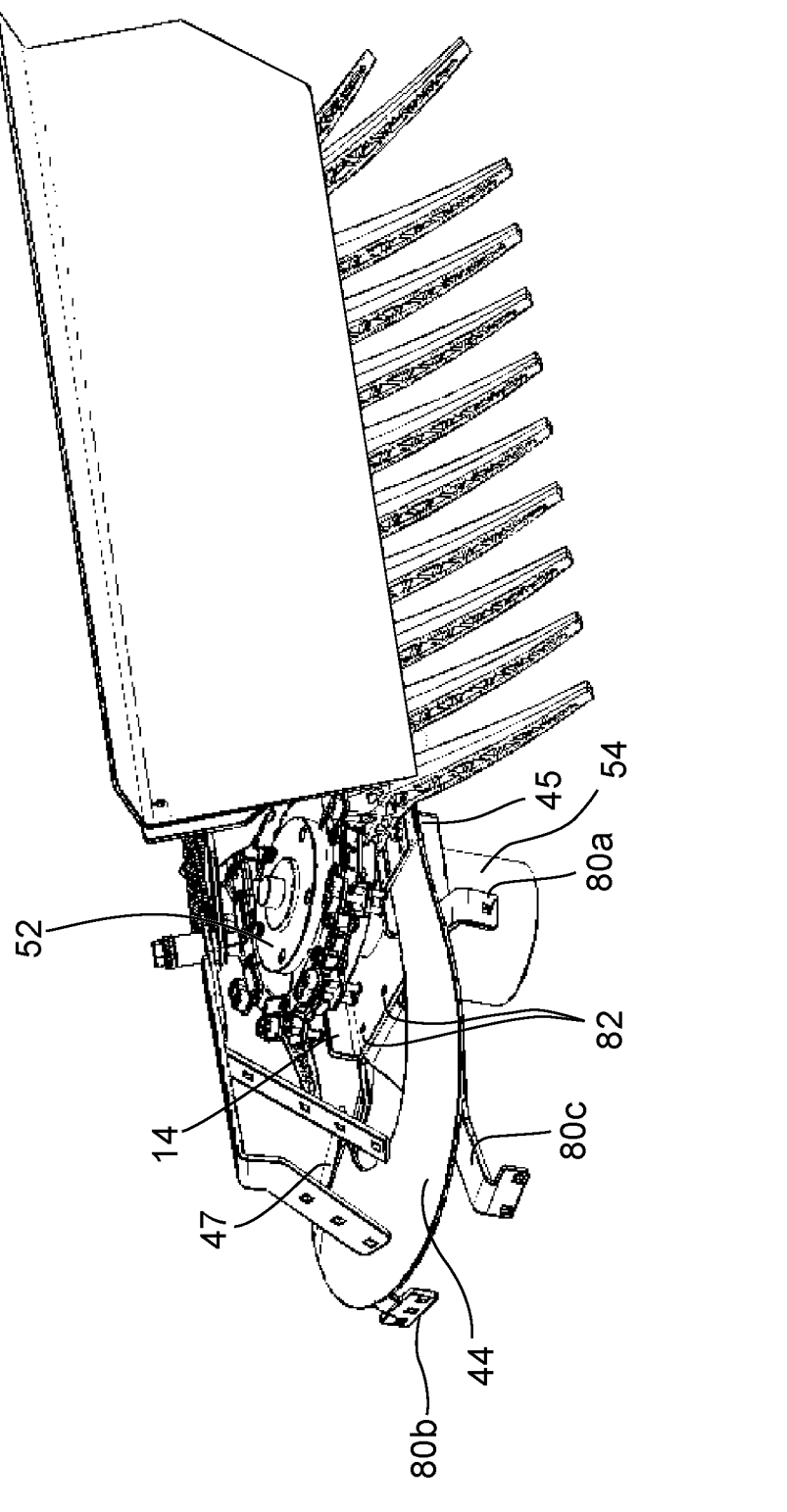
FIG. 17 is a perspective view of the rake apparatus showing the lower stripper guard.
Figure 18:
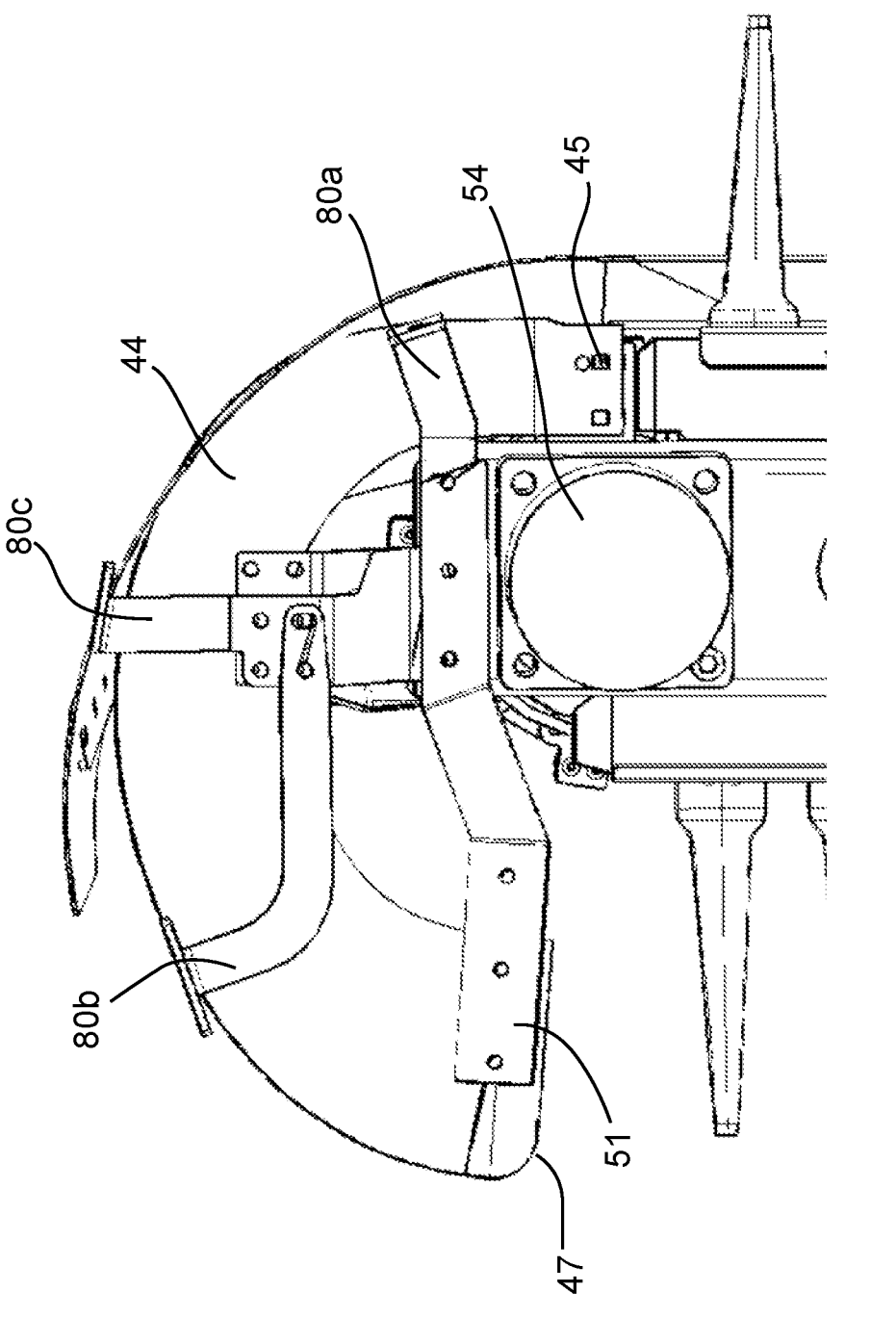
FIG. 18 is a detailed bottom view of the rake apparatus.
Figure 20:
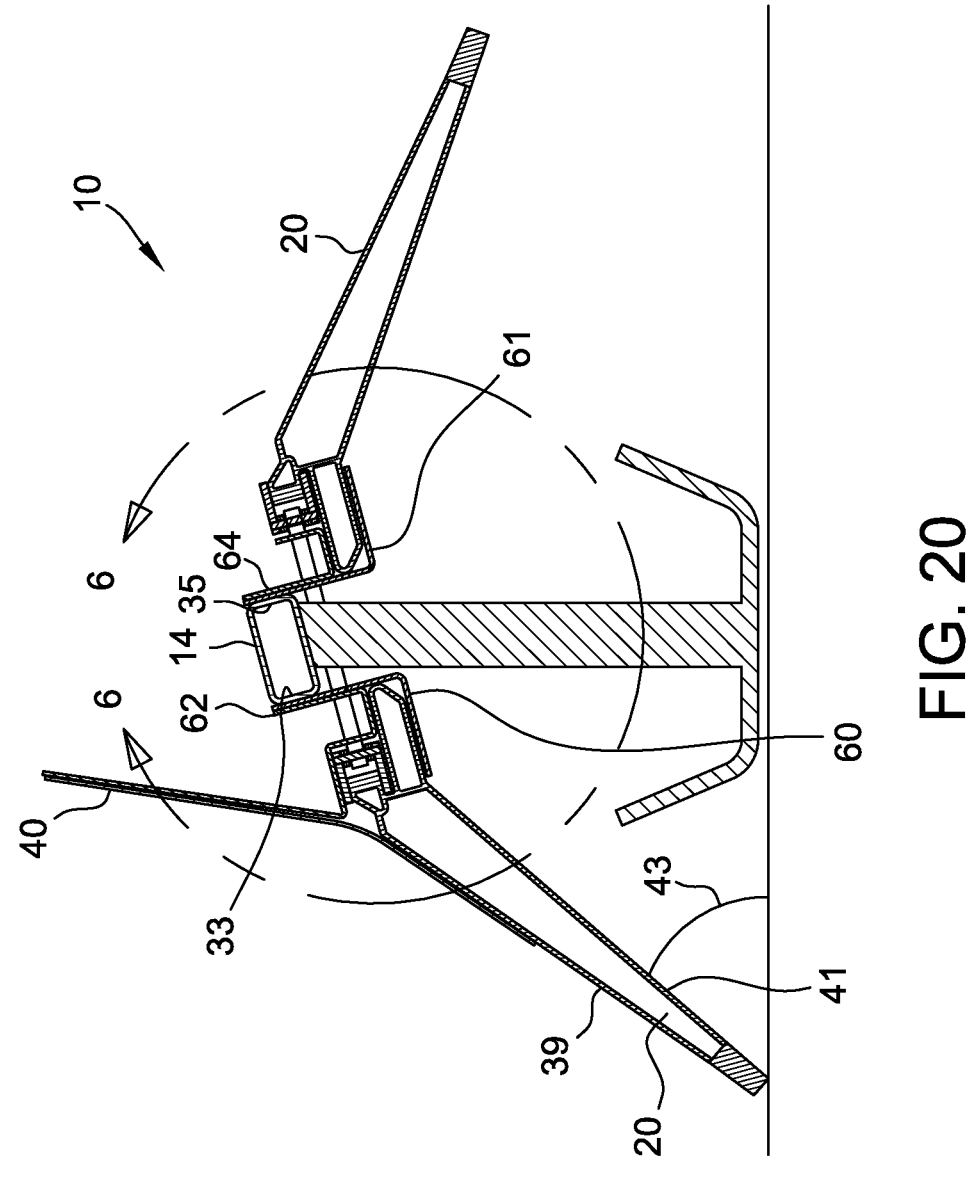
FIG. 20 is a cross-section of the rake apparatus taken along line 5-5 of FIG. 15.

Turning to FIG. 17, a support bracket may be connected to a frame 14 in any suitable manner (e.g., fasteners are by welding). For example, the three support brackets 80a, 80b, 80c shown in FIG. 17 may be connected by fasteners that pass through through-holes 82 in the frame 14. The lower stripper guard 44 may be connected to the frame 14 or to a lower material gathering member guide 60 (as shown in FIG. 20) at its first end 45. The second end 47 of the lower stripper guard 44 may be connected to a bracket 51 (as shown in FIG. 18) that is connected to the frame 14. The lower stripper guard 44 is also in contact with support brackets 80*a*, 80*b*, 80*c*.

Figure 19:
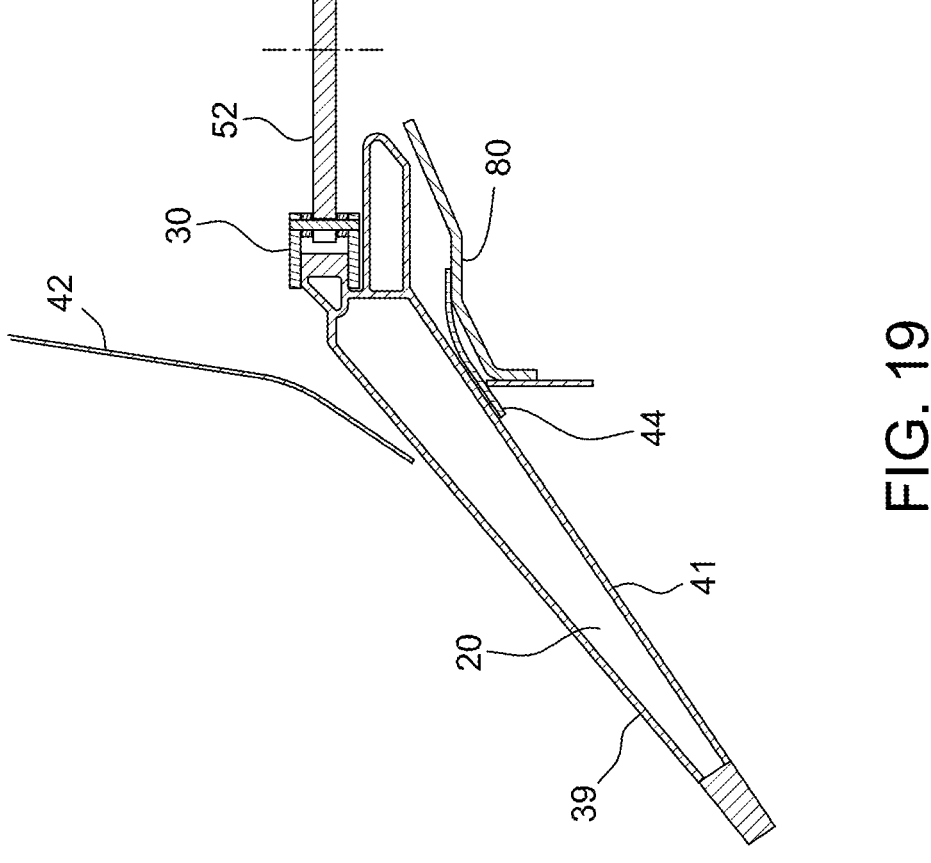
FIG. 19 is a cross-section of the rake apparatus taken along line 9-9 of FIG. 16.

FIG. 19 is a cross-section of the rake apparatus taken along line 9-9 of FIG. 16. The lower stripper guard 44 is supported by a support bracket 80. The support bracket 80 presses against the lower stripper guard 44 to serve as a biasing member and force the lower stripper guard 44 into contact with the bottom surface 41 of the material gathering member 20. The lower stripper guard 44 may exert a force against the material gathering member 20 which reduces or prevents crop material from sliding along with the material gathering member 20. This minimum force depends on the flexibility of the lower stripper guard 44 and by the position and shape of the support bracket 80. Deflection of the lower stripper guard 44 may be determined from the stiffness/ flexibility of the material from which it is made, and the desired amount of force that the guard 44 is intended to generate against the bottom surface 41 of the material gathering members 20.

As shown in FIG. 19, the upper stripper guard 42 is pressed against the top surface 39 of the material gathering members 20, and the lower stripper guard 44 is pressing up against the bottom surface 41 of the material gathering member 20. This reduces the potential that the crop material will be carried by the material gathering member 20 as the material gathering member moves around the drive sprocket 52.

FIG. 20 depicts a cross sectional view of the rake apparatus 10 showing frame 14. A front lower material gathering member guide 60 and a front upper material gathering member guide 62 are connected to a front side 33 of the frame 14. A rear lower material gathering member guide 61 and a rear upper material gathering member guide 64 are mounted to a rear side 35 of the frame 14.

An angle 43 is formed between the material gathering member 20 and a surface, such as the ground or location along which the rake is moved. This angle 43 may range from 10 to 90 degrees. In a preferred embodiment, the angle 43 is between 30 and 70 degrees, and more specifically, the angle 43 is approximately 66 degrees.

Figure 21:
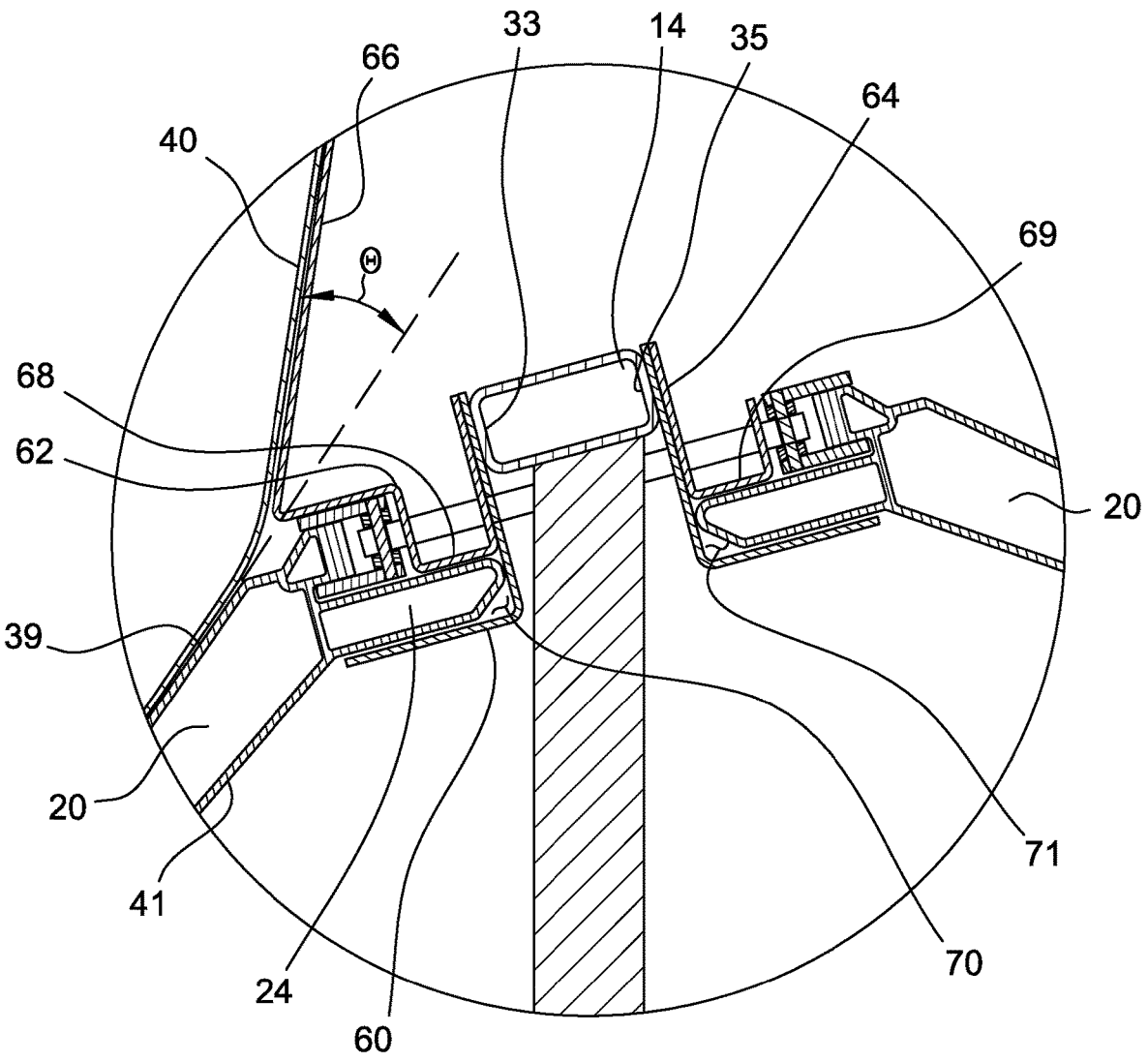
FIG. 21 is a detailed cross-section of the rake apparatus.

As shown in FIG. 21, the front upper material gathering member guide 62 includes a mount surface 66 to which the front deflector guard 40 is mounted. The mount surface 66 and top surface 39 of the material gathering members form an angle θ (e.g., 5° to 60°) when the material gathering members 20 pass under the front deflector guard 40 to cause the front deflector guard 40 to press against the material gathering members 20.

The front upper material gathering member guide 62 includes a material gathering member support surface 68 that is opposed to the front lower material gathering member guide 60 to form a guide channel 70. The front upper material gathering member guide 62 and lower material gathering member guide 60 cooperate to guide and support the carrier 30 (e.g., belt or chain) and the material gathering members 20 as they move between the idler sprocket 51 (FIG. 15) and the drive sprocket 52. Each material gathering member 20 includes a guide tab 24 (FIG. 21) that is received in the guide channel 70. Similarly, the rear upper material gathering member guide 64 includes a material gathering member support surface 69 that is opposed to the rear lower material gathering member guide 1 to form a rear guide channel 71 to receive material gathering members 20.

As shown in FIG. 21, the front deflector guard 40 is connected to the front upper material gathering member guide 62. The front deflector guard 40 may be connected to the front upper material gathering member guide 62 in any suitable manner such as, for example, by fasteners such as plow bolts or rivets or by adhesives.

The upper stripper guard 42 may be connected at its first end 53 to the front upper material gathering member guide 62 at the mount surface 66. The upper stripper guard 42 is connected at its second end 55 to a crank arm 86. The crank arm 86 is pivotally mounted to the frame 14 at a crank arm pivot 84 and is connected to a spring 88. The spring 88 biases the upper stripper guard 42 into contact with the top surface 39 of the material gathering member 20.

Another embodiment of the rake apparatus 10 in which a metal material gathering member 120 is used is shown in FIG. 22. The metal material gathering member 120 includes a spring coil 122 that enables the material gathering member to deflect during use. The metal material gathering member 120 includes a mount tab 124 connected to an upper mount 126. The upper mount 126 connects to the conveyor member 130. The mount tab 124 connects to a lower mount 128 that connects to the conveyor member 130 and forms the guide tab that fits into the guide channels 70, 71.

Figure 23:
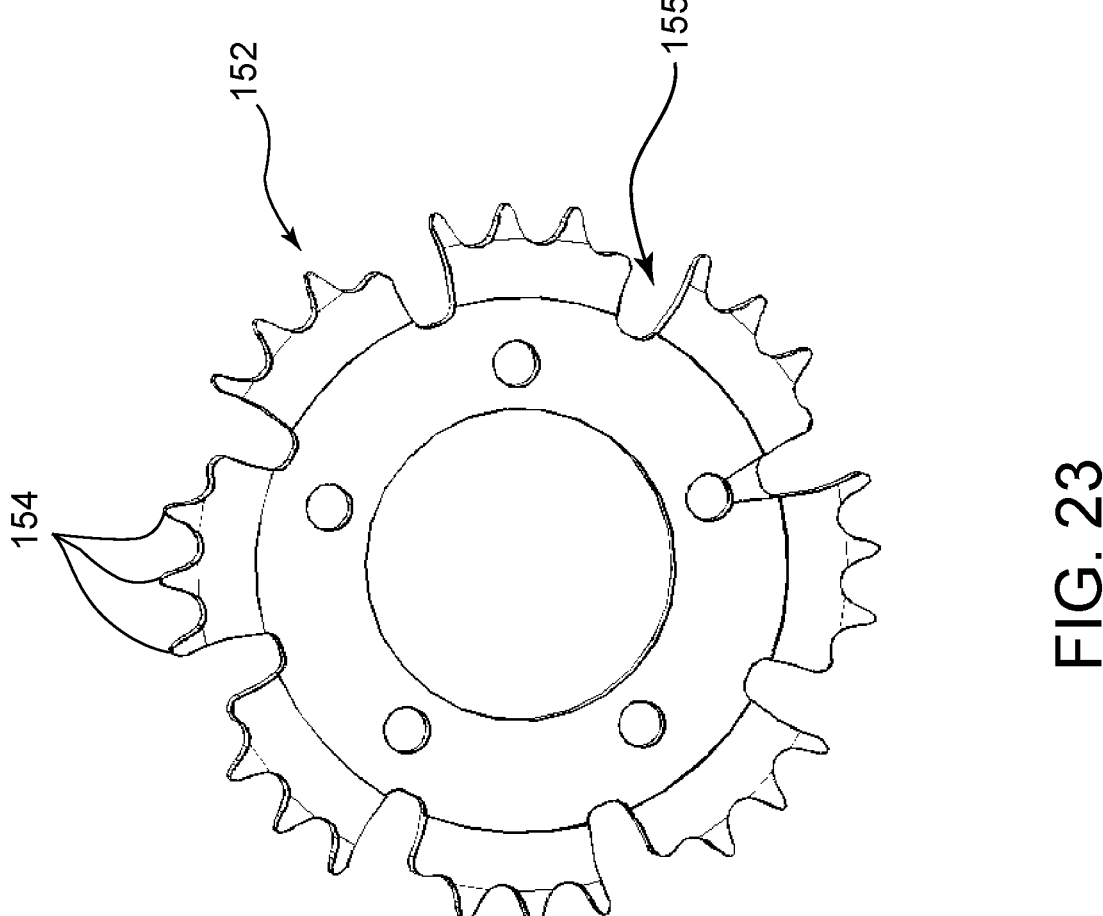
FIG. 23 is a side view of another embodiment of a drive sprocket of the rake apparatus.

FIGS. 23-26 depict another embodiment of the drive sprocket 152 and conveyor member 130. Referring to FIG. 23, the drive sprocket 152 includes a plurality of sprocket teeth 154 and a notch 155 at every fourth sprocket tooth 154. The notch 155 includes a deeper indent relative to the indents between the other sprocket teeth 154.

Figure 24:
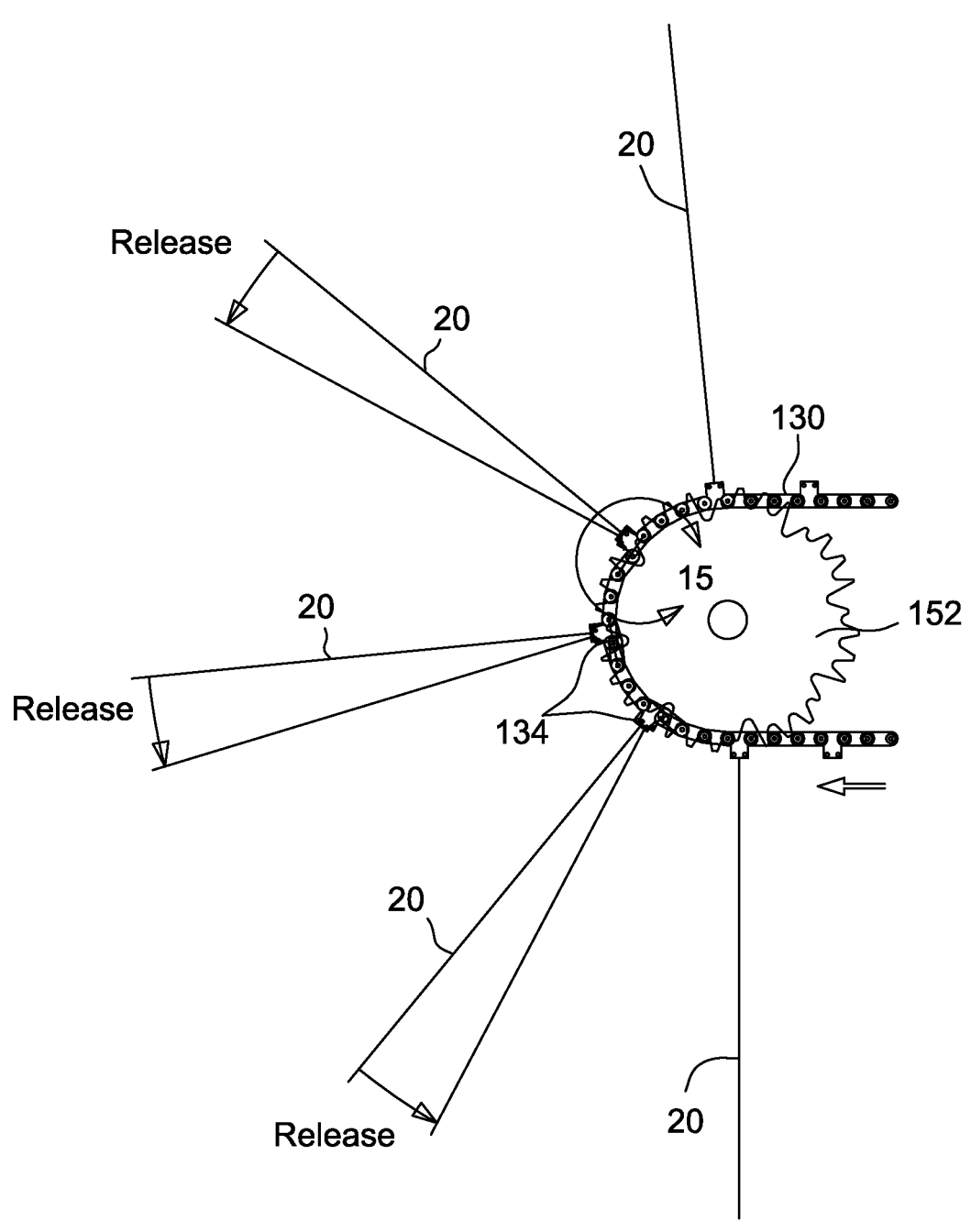
FIG. 24 a schematic depicting the movement of the material gathering members around the sprocket of FIG. 23.

Turning to FIG. 24, the conveyor member 130 includes chain links having an extended section 34 for mounting a material gathering member (e.g., every fourth chain link). The conveyor member 130 may have a given length such that the chain links having the extended section 134 will engage with the corresponding teeth 154 of the sprocket 152. Each time a material gathering member 20 passes around the drive sprocket 152, it has the potential to rotate from a conveying position to a release position (counter clockwise relative to FIG. 24) to provide an opportunity for the crop material to release from the material gathering member 20. Essentially, a portion of the chain (half the link—a pin and bushing) falls in the notch 155. As shown in FIG. 24, the material gathering members 20 near the straight sections (adjacent the front deflector guard 40) of the roller chain do not release backward because tension in the straight section of the chain will tend to hold the material gathering member in a fixed orientation whereas the material gathering members 20 are able to rotate to a release position when the chain links engage the perimeter of the drive sprocket.

Figure 25:
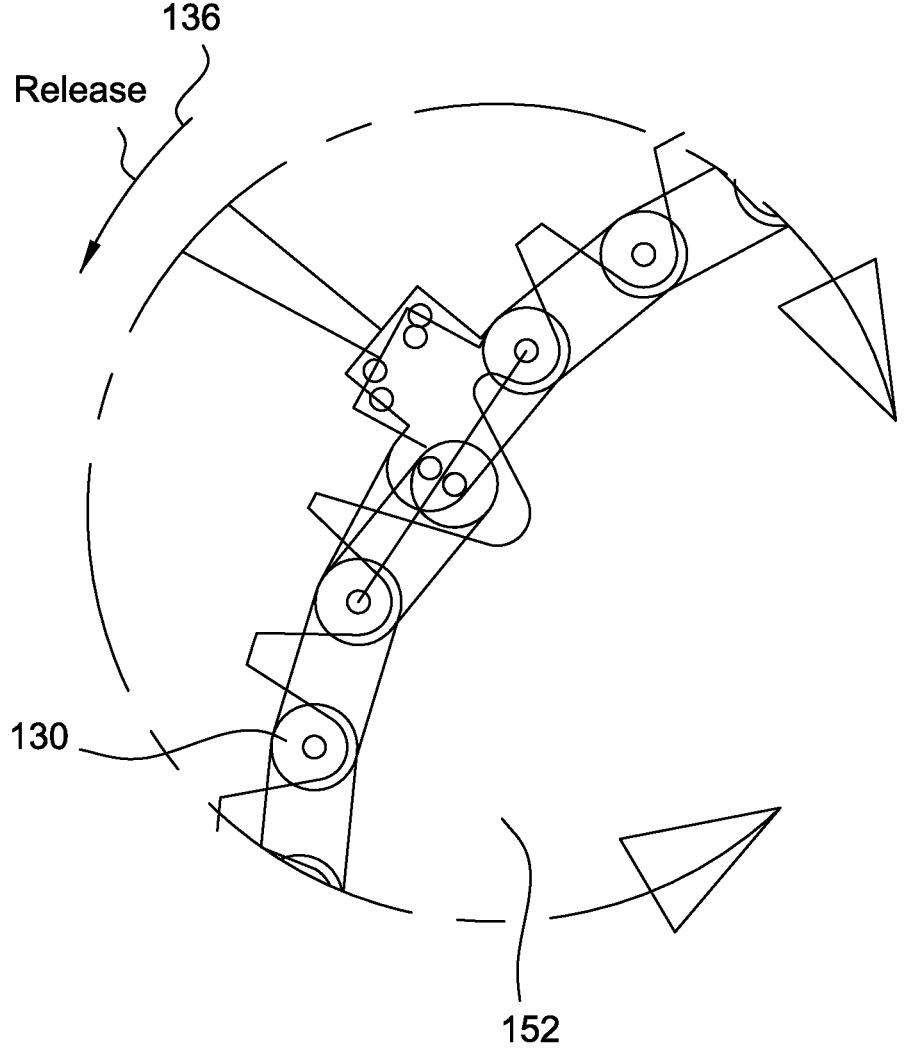
FIG. 25 is an enlarged view of section 15 of FIG. 24.

FIG. 25 is an enlarged view of section 15 of FIG. 24. Arrow 136 indicates a direction of release.

Figures 26A, 26B, 26C:
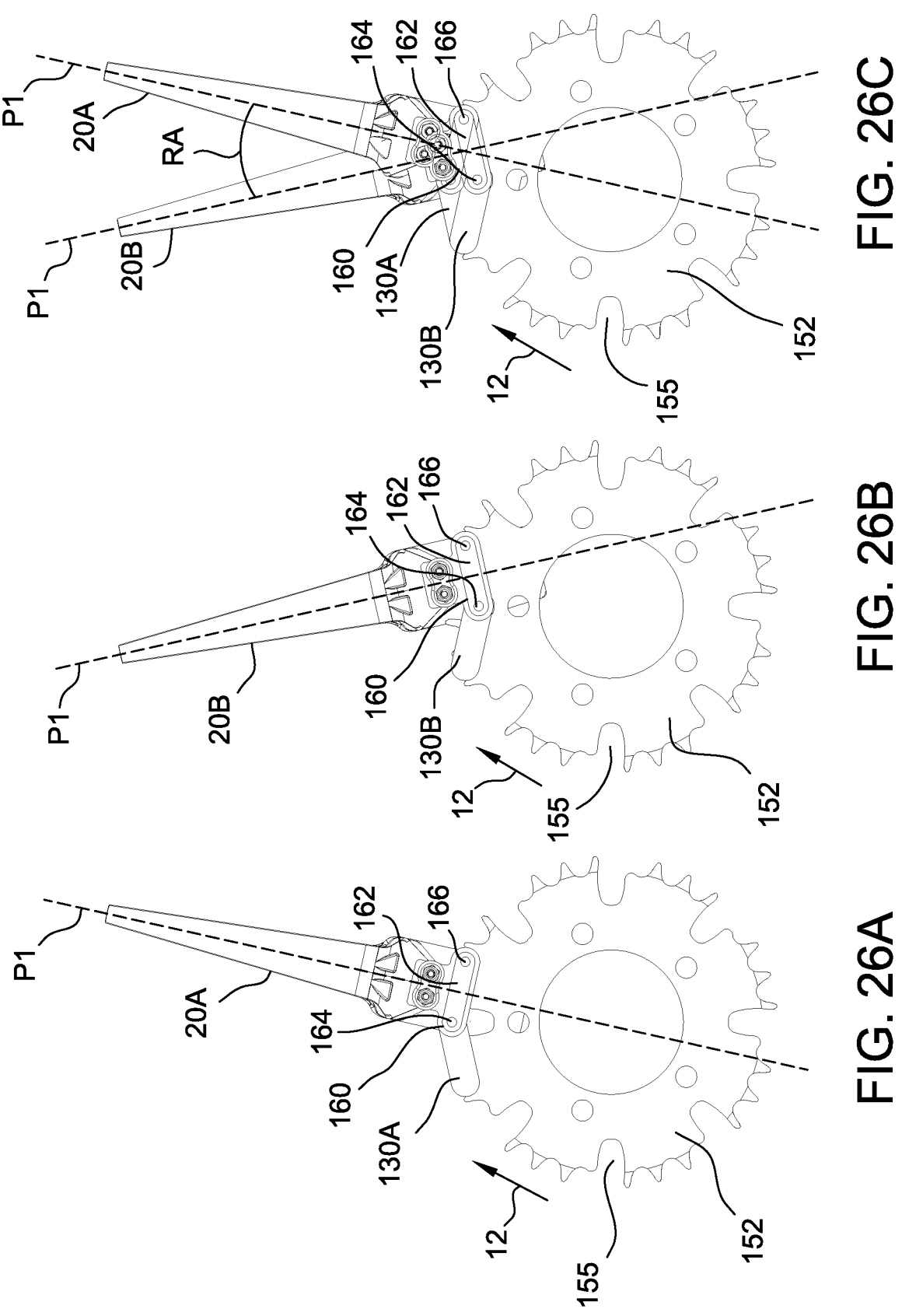
FIG. 26A-C depict a conveying and release position of a material gathering member as it travels around the sprocket.

A conveying position 20A of a material gathering member 20 is shown in FIG. 26A. Each chain link 160 includes a first plate 162, a first post 164, a second plate (not shown) spaced vertically apart from the first plate 162 and a second post 166 spaced laterally from the first post 164. Adjacent chain links 160 are hingeably connected at first post 162 and second post 164, and the second plate (not shown) of adjacent links 160 are hingeably connected to the same post 164, 166 as the first plate 162 of the associated link 166.

As shown in FIG. 26A, in the conveying position 20A, a longitudinal axis P1 of the material gathering member 20 is in line with a diameter of the sprocket 152. FIG. 26B depicts a release position 20B of the material gathering member 20. In the release position 20B, the first post 164 falls into notch 155, and the material gathering member 20 pivots about the second post 166. The transition of the material gathering member 20 into release position 20B allows the material gathering member 20 to withdraw from the crop windrow to prevent the material gathering member 20 from pulling crop toward backside 27.

FIG. 26C depicts the conveying position 20A overlaid with the release position 20B. A release angle RA is defined as the angular deflection of longitudinal axis P1 of material gathering member 20 from the conveying position 20A to the release position 20B. The release angle RA may range from 0-40°, with 25° being shown in the illustrated embodiment. Notch 155 of sprocket 152 is configured accordingly to achieve the desired release angle. Stated differently, in the conveying position 20A the longitudinal axis P1 may align with a diameter of sprocket 152, and/or is approximately orthogonal relative to the direction of travel 12, whereas in the release position 20B the longitudinal axis P1 may not align with the diameter of sprocket 152, and/or may form release angle relative to the direction of travel 12 that is more obtuse than the conveying angle.

FIGS. 27A and 27B depict detailed perspective views of material gathering member 20. As described above, the material gathering member 20 includes the guide tab 24. Material gathering member 20 further includes a finger 90 having a root 92, a tip 94, a first gathering surface 96 and a second gathering surface 98 opposite the first gathering surface 96. The finger 90 is wider nearest to the root 92 and tapers closer to the tip 94. The first and second gathering surfaces 96, 98 extend from the root 92 to the tip 94. The first and second material gathering surfaces 96, 98 have a generally arcuate shape.

The guide tab 24 is integral with the finger and extends from the finger 90. The guide tab further includes a chamfered edge 91, an upper guide tab surface 93, and a lower guide tab surface 89. The chamfered edge 91 enables the guide tab 24 of each material gathering member 20 to be effectively located in the guide channel 71. The material gathering member 20 also includes a mount tab 95 including an upper mount tab surface 97 and a lower mount tab surface 89. The lower mount tab surface is substantially parallel to the upper guide tab surface 93. The upper mount tab surface 97 includes at least one opening 99 adapted to receive an attachment member to support a link of the carrier 30 for moving the material gathering member 20. The lower guide tab surface and the first material gathering surface form an angle of greater than 90 degrees.

Figure 28:
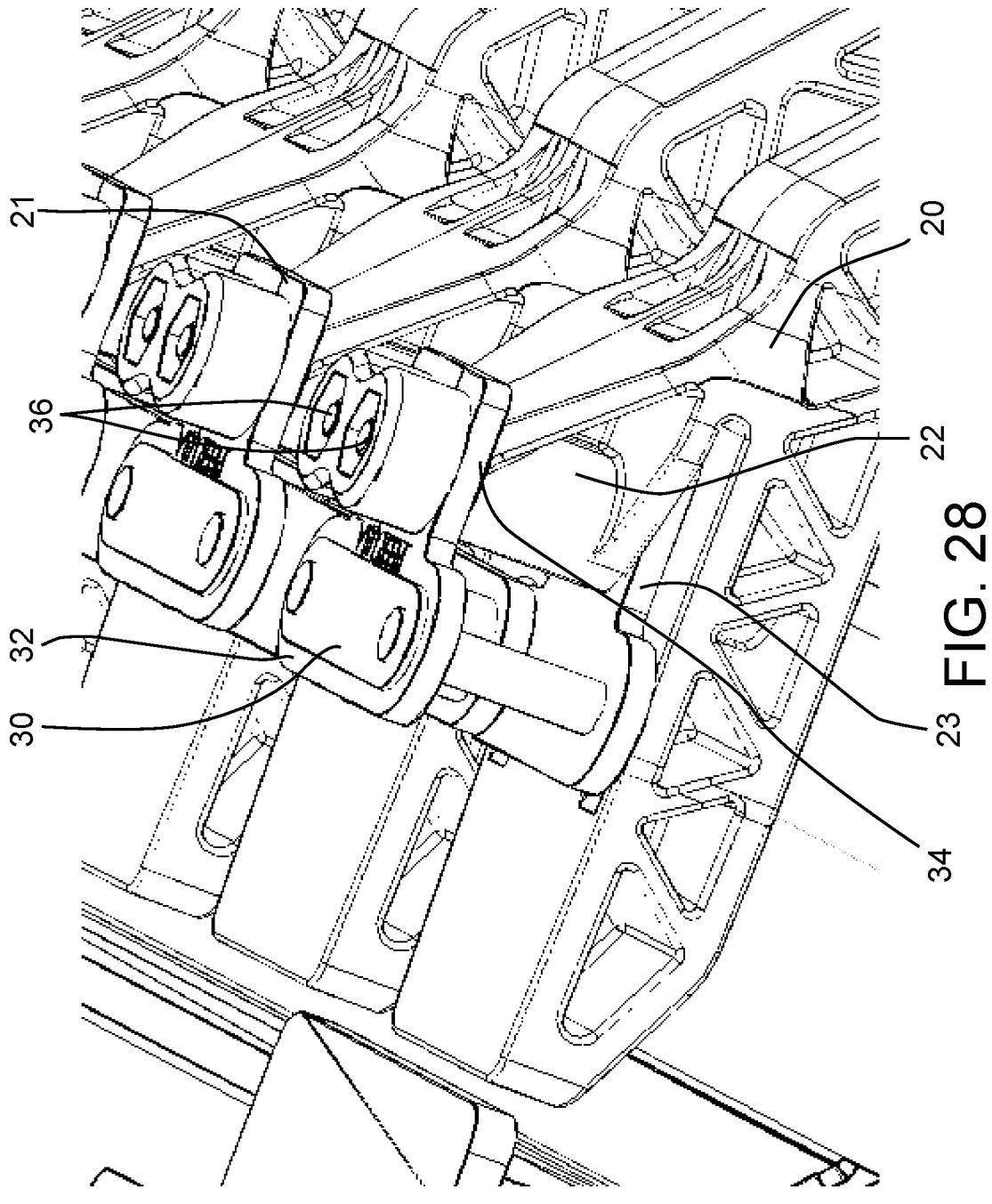
FIG. 28 is a detailed perspective view of the conveyor member of the rake apparatus.

Referring to FIG. 28, chain links 32 are shown with extended section 34. First and second fasteners 36 extend through an upper chain link 21 and a lower chain link 23 and connect a mount tab 22 of each material gathering member 20 to the carrier 30.

Figure 29:
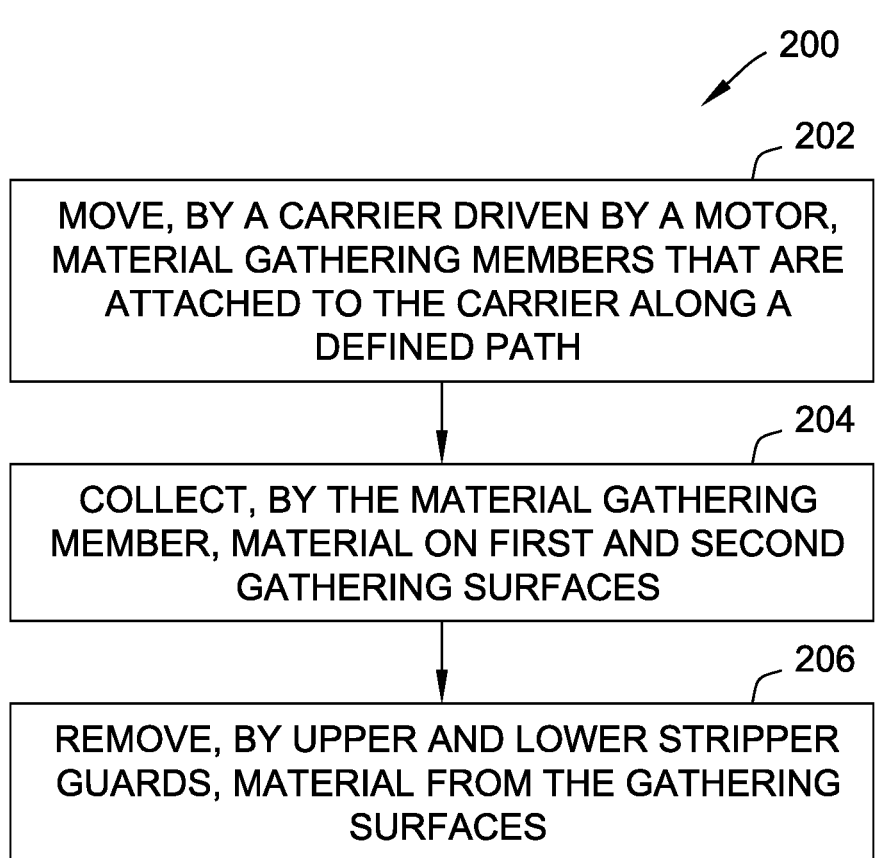
FIG. 29 is a flow chart of a method of releasing material from a rake apparatus.

FIG. 29 is a flow chart of a method 200 of operating the rake apparatus. During operation of rake 10, the carrier 30 is driven by motor 52 and associated drive sprocket 152. The carrier 30 moves 202 the material gathering members 20 that are attached to the carrier 30 along a defined path that includes a conveying zone 31 and a releasing zone 37. As the material gathering members 20 are moved through the conveying zone 31, the members 20 gather material and collect 204 the material on the first and second gathering surfaces 96, 98. The tips 94 of the gathering members 20 are spaced from the edge of the deflector guard 40 and maintain a substantially constant distance from the deflector guard 40 edge.

The members 20 are conveyed by the carrier 30 from the conveying zone 31 to the releasing zone 37. As the members 20 move into the releasing zone 37, the members 20 move through a space that separates the upper and lower stripper guards 42, 44. The upper and lower stripper guards 42, 44 serve to scrape or otherwise cause the material to be removed 206 from the gathering surfaces 96, 98 of the material gathering members 20. As the members 20 move to the releasing zone 37, first post 164 associated with the chain link 160 to which the member 20 is attached locates in notch 155 in sprocket 152. As the sprocket 152 rotates, the first post 164 falls into the notch 155, causing the associated material gathering member 20 to rotate about the second post 166 through a release angle RA. The rotation of the member 20 through the release angle RA, coupled with movement between the stripper guards 42, 44, effectively removes material from the material gathering members 20 as they move along the defined path. The movement of the members 20 is repeated during rake operation in the manner described.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a," "an," "the," and "said" are intended to mean that there are one or more of the elements. The terms "comprising," "including," "containing," and "having" are intended to be inclusive and mean that there may be additional elements other than the listed elements. The use of terms indicating a particular orientation (e.g., "top," "bottom," "side," etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A rake for conveying and releasing material gathered by the rake, the rake comprising:

a carrier moveable in a defined path, at least one material gathering member attached to the carrier to be movable with the carrier in the defined path, each of the at least one material gathering members having a first gathering surface, a second gathering surface, and a tip located away from the carrier, the material collecting on one or both of the surfaces of each of the at least one gathering members as each of the at least one material gathering members is moved along the defined path; and a stripper guard proximate the carrier, a first portion of the stripper guard defining a conveying zone of the defined path and a second portion of the stripper guard defining a releasing zone of the defined path, and wherein the at least one material gathering member is adapted to move closely adjacent or in contact with the stripper guard in the releasing zone, to enable the releasing zone stripper guard to promote displacement of the material from the respective first and second gathering surfaces of each of the at least one material gathering members, and wherein the second portion of the stripper guard has a tapered contour for contacting different portions of the at least one material gathering member as the at least one material gathering member is moved through the releasing zone.

2. The rake of claim 1 wherein the rake comprises a plurality of material gathering members attached to the carrier.

3. The rake of claim 1, wherein the rake comprises a plurality of material gathering members, the portion of the stripper guard defining the releasing zone further comprising an upper stripper guard and a lower stripper guard, the material gathering members being located between the upper and lower stripper guards as each of the material gathering members is moved by the carrier through the releasing zone.

4. The rake of claim 3 wherein the upper stripper guard and the lower stripper guard have an arcuate shape.

5. The rake of claim 1, wherein the rake includes a biasing member that preloads at least a portion of the stripper guard causing the stripper guard to be urged against the at least one material gathering member.

6. The rake of claim 1 wherein the at least one material gathering member travels in a first direction from the conveying zone to the releasing zone, the stripper guard having a stripper guard edge, the stripper guard edge and tip of each of the at least one material gathering members being separated by a distance.

7. The rake of claim 6 wherein the stripper guard has a conveying portion end, and a releasing portion end, the stripper guard edge extending between the conveying portion end and the releasing portion end, the distance between the stripper guard edge and tip of each of the at least one material gathering members being substantially the same as the at least one gathering member travels through the conveying portion, and wherein in the releasing zone the distance from the edge of the stripper guard to the tip of each of the at least one material gathering members progressively decreases until each of the at least one material gathering members passes the releasing portion end.

8. The rake of claim 1, wherein the conveying zone includes a conveying portion end, the rake further including a frame supporting the stripper guard and a skid member attached to the frame, the skid being located near the conveying portion end.

9. The rake of claim 8 wherein the skid comprises a disk-shaped member and a shaft extending between the disk-shaped member and the frame.

10. The rake of claim 8 wherein the location of the skid relative to the frame is adjustable.

11. The rake of claim 8 wherein the skid is adapted to contact a surface and prevent the at least one material gathering member from contacting the surface.

12. The rake of claim 1 wherein the rake comprises a frame that defines a guide channel, the carrier comprises at least one link, and wherein the at least one material gathering member comprises a finger and a root, the first gathering surface and the second gathering surface located along the finger; and wherein the first and second gathering surfaces extend between the root and the tip;

the at least one gathering member further comprising:
    a guide tab integral with the finger and extending from the finger; and
    a mount tab integral with the finger, the guide tab and mount tab defining a slot therebetween wherein the slot is adapted to receive a first link of the carrier for moving the material gathering member, the guide tab being movable in the guide channel.

13. The rake of claim 1 wherein the carrier comprises a combination of a chain, driven by at least one movable sprocket member, the chain including a plurality of connected links, wherein each link in the chain comprises a first plate, a first post, a second plate spaced vertically from the first plate, and a second post spaced laterally from the first post.

14. The rake of claim 13 wherein the first plates of adjacent links are hingeably connected at the first and second post and the second plates of adjacent links are hingeably connected to the same post as the first plate of the associated link, each sprocket comprising a plurality of teeth and a plurality of notches spaced about the sprocket, the teeth extending radially outwardly and the notches extending radially inwardly.

15. The rake of claim 14 wherein each sprocket comprises a sprocket direction of rotation, the first and second posts of the link where one of the material gathering members is attached being located between a pair of the plurality of teeth and in the notches, the first post being seated between the pair of the plurality of teeth, the second post being located in the notch to enable the second post to move toward a bottom of the notch causing the at least one material gathering member to rotate in a direction opposite the direction of rotation of the sprocket.

16. The rake of claim 15 wherein the extent of rotation of the at least one material gathering member comprises a release angle, the release angle being up to 40 degrees.

17. The rake of claim 16 wherein the release angle comprises the angle formed between the at least one gathering member when the second post is adjacent the notch and the position of the at least one material gathering member when the second post is located in the notch proximate the bottom of the notch.

18. A method for releasing material from a material gathering members included in a rake, where the rake is coupled to a vehicle wherein the rake comprises a carrier moveable in a defined path, at least one material gathering member attached to the carrier to be movable with the carrier in the defined path, each of the at least one material gathering members having a first side, a second side, and a tip located away from the carrier, the material collecting on one or both of the sides of each of the at least one gathering members as each of the at least one material gathering members is moved along the defined path; and a stripper guard proximate the carrier, a first portion of the stripper guard defining a conveying zone of the defined path and a second portion of the stripper guard defining a releasing zone of the defined path, the method comprising:

moving the at least one material gathering member closely adjacent or in contact with the stripper guard in the releasing zone, to promote displacement of the material from the respective first and second sides of each of the at least one material gathering members, wherein the second portion of the stripper guard has a tapered contour for contacting different portions of the at least one material gathering member as the at least one material gathering member is moved through the releasing zone.

19. The method of claim 18 wherein the stripper guard of the releasing zone comprises upper and lower stripping guards separated by a distance, the method further comprising moving the at least one material gathering member in the distance between the upper and lower stripper guards.

20. The method of claim 19 wherein the at least one material gathering member comprises a root, the first and second sides of the material gathering member extending between the root and the tip, the tip being separated from the upper and lower stripper guards by a distance and wherein the method further comprises decreasing the distance between the tip and the upper and lower stripper guards as the at least one member moves through the releasing zone.

* * * * *